(12) United States Patent
Bos et al.

(10) Patent No.: US 11,479,690 B2
(45) Date of Patent: *Oct. 25, 2022

(54) MATT POWDER COATINGS

(71) Applicant: COVESTRO (NETHERLANDS) B.V., Geleen (NL)

(72) Inventors: Matthias Johannes Cornelis Bos, Echt (NL); Paulus Franciscus Anna Buijsen, Echt (NL); Johannes Albertus Hettinga, Echt (NL)

(73) Assignee: COVESTRO (NETHERLANDS) B.V., Geleen (NL)

( * ) Notice: Subject to any disclaimer, the term of this patent is extended or adjusted under 35 U.S.C. 154(b) by 0 days.

This patent is subject to a terminal disclaimer.

(21) Appl. No.: 17/196,937

(22) Filed: Mar. 9, 2021

(65) Prior Publication Data
US 2021/0198519 A1 Jul. 1, 2021

Related U.S. Application Data

(63) Continuation of application No. 15/328,753, filed as application No. PCT/EP2015/065699 on Jul. 9, 2015, now Pat. No. 11,046,865.

(30) Foreign Application Priority Data

Jul. 25, 2014 (EP) .................................... 14178486
Jul. 25, 2014 (EP) .................................... 14178487
Jul. 25, 2014 (EP) .................................... 14178488

(51) Int. Cl.
| | |
|---|---|
| *C09D 167/02* | (2006.01) |
| *C08G 63/20* | (2006.01) |
| *C09D 167/00* | (2006.01) |
| *C08G 63/16* | (2006.01) |
| *C09D 5/03* | (2006.01) |
| *B05D 1/06* | (2006.01) |
| *B05D 1/10* | (2006.01) |
| *B05D 3/02* | (2006.01) |
| *C09D 167/03* | (2006.01) |
| *C08L 67/00* | (2006.01) |
| *C08L 67/02* | (2006.01) |
| *C08L 67/03* | (2006.01) |
| *C08G 63/123* | (2006.01) |
| *C08G 63/02* | (2006.01) |
| *C08G 63/127* | (2006.01) |
| *C08G 63/12* | (2006.01) |
| *C08G 63/00* | (2006.01) |
| *C08G 63/18* | (2006.01) |
| *C08G 63/181* | (2006.01) |
| *C08G 63/183* | (2006.01) |
| *C08J 3/24* | (2006.01) |
| *C08K 5/00* | (2006.01) |
| *C08K 5/1515* | (2006.01) |
| *C08K 5/32* | (2006.01) |

(52) U.S. Cl.
CPC .............. *C09D 167/02* (2013.01); *B05D 1/06* (2013.01); *B05D 1/10* (2013.01); *B05D 3/0263* (2013.01); *B05D 3/0272* (2013.01); *C08G 63/16* (2013.01); *C08G 63/20* (2013.01); *C09D 5/03* (2013.01); *C09D 5/032* (2013.01); *C09D 167/00* (2013.01); *B05D 3/02* (2013.01); *B05D 2401/32* (2013.01); *B05D 2508/00* (2013.01); *C08G 63/00* (2013.01); *C08G 63/02* (2013.01); *C08G 63/12* (2013.01); *C08G 63/123* (2013.01); *C08G 63/127* (2013.01); *C08G 63/18* (2013.01); *C08G 63/181* (2013.01); *C08G 63/183* (2013.01); *C08G 2150/20* (2013.01); *C08J 3/24* (2013.01); *C08J 2367/00* (2013.01); *C08J 2367/02* (2013.01); *C08J 2367/03* (2013.01); *C08K 5/0025* (2013.01); *C08K 5/1515* (2013.01); *C08K 5/32* (2013.01); *C08L 67/00* (2013.01); *C08L 67/02* (2013.01); *C08L 67/03* (2013.01); *C08L 2205/02* (2013.01); *C09D 5/033* (2013.01); *C09D 167/03* (2013.01); *Y10T 428/31786* (2015.04); *Y10T 428/31794* (2015.04)

(58) Field of Classification Search
None
See application file for complete search history.

(56) References Cited

U.S. PATENT DOCUMENTS

| | | | |
|---|---|---|---|
| 3,270,855 A | 9/1966 | Harper et al. |
| 4,740,580 A | 4/1988 | Merck |
| 5,151,493 A | 9/1992 | Smith et al. |
| 5,168,110 A | 12/1992 | Van Den Elshout |
| 5,264,529 A | 11/1993 | Nozaki |
| 5,741,602 A | 4/1998 | Hoppe |
| 5,856,378 A | 1/1999 | Ring |

(Continued)

FOREIGN PATENT DOCUMENTS

| | | |
|---|---|---|
| CA | 2346963 | 4/2000 |
| CN | 1198457 | 11/1998 |

(Continued)

OTHER PUBLICATIONS

International Search Report for PCT/EP2015/065699, dated Sep. 10, 2015, 3 pages.

*Primary Examiner* — Vivian Chen
(74) *Attorney, Agent, or Firm* — Nixon & Vanderhye P.C.

(57) ABSTRACT

A branched carboxylic acid functional polyester resin P is described herein along with thermosetting powder coating compositions (PCC A) comprising a binder K, the binder K comprising the polyester resin P and a crosslinker X. The invention further relates to a cured PCC A. In addition, processes for making said PCC A and processes for coating an article with said PCC A are described as well as articles having coated thereon the PCC A and an articles having coated and cured thereon the PCC A.

20 Claims, No Drawings

(56) References Cited

U.S. PATENT DOCUMENTS

| | | | |
|---|---|---|---|
| 6,015,864 A | 1/2000 | Koenraadt | |
| 6,100,349 A | 8/2000 | Koenraadt | |
| 6,121,408 A | 9/2000 | Aoki | |
| 6,313,234 B1 | 11/2001 | Kaplan | |
| 6,350,821 B1 | 2/2002 | Alford | |
| 6,531,524 B2 | 3/2003 | Ring | |
| 6,555,226 B1 | 4/2003 | Kulzick | |
| 6,599,993 B1 | 7/2003 | Norris | |
| 8,901,250 B2 | 12/2014 | Moens | |
| 9,096,711 B2 | 8/2015 | Bijusen | |
| 9,169,419 B2 | 10/2015 | Bijusen | |
| 9,365,740 B2 * | 6/2016 | Hancill | C08G 63/914 |
| 10,179,867 B2 | 1/2019 | Huang | |
| 10,676,637 B2 | 6/2020 | Bos | |
| 10,703,930 B2 | 7/2020 | Bos | |
| 11,046,865 B2 * | 6/2021 | Bos | C09D 5/03 |
| 2001/0006993 A1 | 7/2001 | Ring | |
| 2001/0051227 A1 | 12/2001 | Jung | |
| 2004/0018311 A1 | 1/2004 | Shah | |
| 2004/0071955 A1 | 4/2004 | Moens | |
| 2004/0110907 A1 | 6/2004 | Weiss | |
| 2004/0132924 A1 | 7/2004 | Weiss | |
| 2004/0143073 A1 | 7/2004 | Bejko | |
| 2006/0173127 A1 | 8/2006 | Asami | |
| 2008/0233300 A1 | 9/2008 | Cinoman | |
| 2008/0255272 A1 | 10/2008 | Weiss | |
| 2008/0262153 A1 | 10/2008 | Reich | |
| 2010/0010151 A1 | 1/2010 | Fugier | |
| 2010/0311896 A1 | 12/2010 | Cavalieri | |
| 2012/0070630 A1 | 3/2012 | Buijssen | |
| 2012/0107629 A1 | 5/2012 | Moens | |
| 2012/0231283 A1 | 9/2012 | Buijsen | |
| 2013/0041103 A1 | 2/2013 | Grenda | |
| 2014/0163157 A1 | 6/2014 | Minesso | |
| 2014/0221562 A1 | 8/2014 | Hancil | |
| 2014/0234642 A1 | 8/2014 | Huang | |
| 2016/0009949 A1 | 1/2016 | Jansen | |
| 2016/0017153 A1 | 1/2016 | Jansen | |
| 2017/0037256 A1 | 2/2017 | Bongaerts | |
| 2021/0002492 A1 * | 1/2021 | Molhoek | C08K 5/0025 |

FOREIGN PATENT DOCUMENTS

| | | | |
|---|---|---|---|
| CN | 101205293 | | 6/2005 |
| CN | 102666754 | | 8/2015 |
| EP | 0 698 645 | | 2/1996 |
| EP | 1 067 159 A | * | 1/2001 |
| EP | 1 980 582 | | 10/2008 |
| JP | 57-109864 | | 7/1982 |
| JP | 10-007944 | | 1/1998 |
| JP | 2002-060681 | | 2/2002 |
| JP | 2007-009139 | | 1/2007 |
| JP | 4890276 | | 12/2011 |
| WO | 2004/069896 | | 8/2004 |
| WO | 2008/068068 | | 6/2008 |
| WO | 2012/034507 | | 3/2012 |
| WO | 2013/017606 | | 2/2013 |

* cited by examiner

MATT POWDER COATINGS

CROSS-REFERENCE TO RELATED APPLICATIONS

This application is a continuation of commonly owned U.S. application Ser. No. 15/328,753 filed Jan. 24, 2017 (now U.S. Pat. No. 11,046,865), which is the U.S. national phase of International Application No. PCT/EP2015/065699 filed Jul. 9, 2015, which designated the U.S. and claims priority to EP Patent Application Nos. 14178487.6 filed Jul. 25, 2014, 14178488.4 filed Jul. 25, 2014, and 14178486.8 filed Jul. 25, 2014, the entire contents of each of which are hereby incorporated by reference.

BACKGROUND AND SUMMARY

The invention relates to a branched carboxylic acid functional polyester resin P as described herein. The invention further relates to a thermosetting powder coating composition (PCC A) comprising a binder K, said binder K comprising the P and a crosslinker X. The invention further relates to a cured PCC A. The invention further relates to a process for making said PCC A and processes for coating an article with said PCC A. The invention further relates to an article having coated thereon said PCC A as well as to an article having coated and cured thereon said PCC A. The invention further relates to a thermosetting powder coating composition B (PCC B) comprising a physical mixture of the thermosetting powder coating composition A (PCC A) with a separate, distinct thermosetting powder coating composition A1 (PCC A1). The invention further relates to a process for making said thermosetting powder coating composition B and processes for coating an article with said PCC B. The invention further relates to a cured PCC B. The invention further relates to an article having coated thereon said thermosetting powder coating composition B as well as to an article having coated and cured thereon said thermosetting powder coating composition B. The invention further relates to use of: the polyester resin P, the PCC A, the cured PCC A, the PCC B, the cured PCC B, articles coated with the PCC A, articles coated with the PCC B, articles having coated and cured thereon the PCC A, articles having coated and cured thereon the PCC B. The invention further relates to the use of the polyester resin P for matt powder coatings. The invention further relates to the use of the PCC B for matt powder coatings.

Powder coating compositions which are substantially dry, finely divided, free flowing, solid materials at room temperature and at atmospheric pressure, have gained considerable popularity in recent years over liquid coating compositions for a number of reasons. For one powder coatings are user and environmentally friendly materials since they are virtually free of harmful volatile organic solvents carriers that are normally present in liquid coating compositions. Therefore, powder coatings give off little, if any, volatile materials to the environment when cured. This eliminates the solvent emission problems associated with liquid coating compositions such as air pollution and dangers to the health of workers employed in coating operations. Powder coating compositions (or commonly also known as powders) are also clean and convenient to use since they are applied in a clean manner over the substrate because they are in substantially dry solid form. The powders are easily swept up in the event of a spill and do not require special cleaning and spill containment supplies, as do liquid coating compositions. Working hygiene is thus improved. Moreover, powder coating compositions are essentially 100% recyclable since the sprayed powders can be fully reclaimed and recombined with fresh powder feed. Recycling of liquid coatings during application is often not done, which leads to increased waste and hazardous waste disposal costs. In addition, powder coating compositions are ready to use, i.e., no thinning or dilution is required.

Powder coating compositions are typically finely divided particles of a polymer, and a crosslinker in case of a thermosetting powder coating composition, that also usually contain pigments, fillers, and other additives. After application to the substrate, the individual powder particles are melted in an oven and coalesce to form a continuous film typically known as a powder coating having decorative and protective properties associated with conventional organic coatings. Methods of application of powder coating compositions are considered to be fusion-coating processes; that is, at some time in the coating process the powder particles must be fused or melted. Although this is usually carried out in a convection oven, infrared and induction heating methods have also been used. Therefore, with minor exceptions, powder coatings are factory applied in fixed installations, essentially excluding their use in maintenance applications. Powder coating compositions are typically applied on a substrate via an electrostatic spray process; the powder coating composition is dispersed in an air stream and passed through a corona discharge field where the particles acquire an electrostatic charge. The charged particles are attracted to and deposited on the grounded object to be coated. The object usually at room temperature, is then placed in an oven where the powder melts and forms a powder coating. A hybrid process based on a combination of high voltage electrostatic charging and fluidized-bed application techniques (electrostatic fluidized bed) has evolved, as well as triboelectric spray application methods. Powder coating compositions and their process of application are the preferred coating compositions and process for coating many familiar items such as lawn and garden equipment, patio and other metal furniture, electrical cabinets, lighting, shelving and store fixtures, and many automotive components. Today, powder coating compositions are widely accepted, with thousands of installations in the factories of original equipment manufacturers (OEMS) and custom coating job shops.

Powder coating compositions can be thermosetting or thermoplastic. The present invention relates to the field of thermosetting powder coating compositions. The preparation of thermosetting powder coating compositions is described by Misev in "Powder Coatings, Chemistry and Technology" (pp. 224-300; 1991, John Wiley).

In a variety of applications such as white goods (e.g. fridges, freezers, washing machines, dishwashers), furniture (e.g. tables, chairs), cable covers, docking stations, tractors, crane, forklifts, bulldozers, matt coatings and especially matt powder coatings are required. Typically, high gloss coatings are easier to achieve in respect to matt coatings; the formulation of matt thermosetting powder coatings poses a series of challenges for the formulator such as poor physical and/or mechanical properties, poor storage stability of the thermosetting powder coating composition, a process for making thermosetting powder coating compositions suitable for matt powder coatings that is expensive and difficult to control, and inconsistency of the matting effect of the powder coatings (large batch-to-batch variation) and high dependency of the curing conditions of the thermosetting powder coating compositions suitable for matt powder coatings. However, the modern challenges for the formulator of matt powder coatings do not end here.

The typical curing temperatures of thermosetting powder coating compositions range from 180 to 225° C. In order to comply with more stringent environmental regulations, there has been increased attention to the development of thermosetting powder coating compositions that can be cured at temperatures lower than 180° C. A decrease in temperature at which a thermosetting powder coating composition can be cured is desired as this is economically, environmentally and technically advantageous. A decrease in curing temperature, while keeping the cure time constant, reduces the energy consumption, which is beneficial both from an ecological and an economical point of view, rendering at the same time this type of thermosetting powder coating compositions attractive to powder coaters since the throughput of their powder coating lines may also be significantly increased. Furthermore, due to a decrease of cure temperature, heat-sensitive substrates may also be used, thereby broadening the field of application for such a thermosetting powder coating composition. Powder coatings resulting from low bake thermosetting powder coating compositions may however display poor physical and/or mechanical properties such as for example poor reverse impact resistance due to inadequate cure.

Therefore, the combination of matting, low bake, good storage stability, good mechanical properties such as for example good reverse impact resistance, poses a serious challenge for a formulator of thermosetting powder coating compositions.

Therefore, there is a desire for thermosetting powder coating compositions that not only can be cured at lower temperatures (curing at low temperatures is also referred to herein as low bake) and be storage stable but also have the ability to produce upon curing matt powder coatings that have also good reverse impact resistance.

It is therefore the object of the invention to provide storage stable, low bake thermosetting powder coating compositions that upon curing provide matt powder coatings having good reverse impact resistance (RIR).

This object is achieved by a branched carboxylic acid functional polyester resin P—as described herein and as defined by the claims—which when used in a thermosetting powder coating composition A (PCC A)—as described herein and as defined by the claims- and said PCC A is used in a thermosetting powder coating composition B (PCC B)—as described herein and as defined by the claims—, the PCC B are storage stable, low bake and upon curing can provide matt powder coatings having good reverse impact resistance (RIR).

Broadly in accordance with the invention, there is provided a branched carboxylic acid functional polyester resin P as described herein and as defined by the claims.

Broadly in accordance with the invention, there is provided a binder K as described herein and as defined by the claims.

Broadly in accordance with the invention, there is provided a thermosetting powder coating composition A (PCC A) as described herein and as defined by the claims.

Broadly in accordance with the invention, there is provided a thermosetting powder coating composition B (PCC B) as described herein and as defined by the claims.

Broadly in accordance with the invention, there is provided a cured thermosetting powder coating composition A as described herein and as defined by the claims.

Broadly in accordance with the invention, there is provided a cured thermosetting powder coating composition B, as described herein and as defined by the claims.

Broadly in accordance with the invention, there is provided an article having coated thereon a thermosetting powder coating composition A as described herein and as defined by the claims.

Broadly in accordance with the invention, there is provided an article having coated thereon a thermosetting powder coating composition B as described herein and as defined by the claims.

Broadly in accordance with the invention, there is provided an article having coated and cured thereon a thermosetting powder coating composition A as described herein and as defined by the claims.

Broadly in accordance with the invention, there is provided an article having coated and cured thereon a thermosetting powder coating composition B as described herein and as defined by the claims.

Broadly in accordance with the invention, there is provided a process for making an article having coated and cured thereon either a thermosetting powder coating composition A as described herein and as defined by the claims.

Broadly in accordance with the invention, there is provided a process for making an article having coated and cured thereon either a thermosetting powder coating composition B as described herein and as defined by the claims.

Broadly in accordance with the invention, there is provided a use of:
i) a branched carboxylic acid functional polyester resin P as described herein and as defined by the claims; or
ii) a thermosetting powder coating composition A as described herein and as defined by the claims; or
iii) a thermosetting powder coating composition B as described herein and as defined by the claims; or
iv) a cured thermosetting powder coating composition A as described herein and as defined by the claims; or
v) a cured thermosetting powder coating composition B as described herein and as defined by the claims; or
vi) an article as described herein and as defined by the claims;

in powder coatings, powder-in-mould coatings, 3D-printing, automotive applications, marine applications, aerospace applications, medical applications, defense applications, sports/recreational applications, architectural applications, bottling applications, household applications, machinery applications, can applications, coil applications, energy applications, textile applications and electrical applications.

Broadly in accordance with the invention there is provided a use of a branched carboxylic acid functional polyester resin P as described herein and as defined by the claims for matt powder coatings.

Broadly in accordance with the invention there is provided a use of a a thermosetting powder coating composition B as described herein and as defined by the claims for matt powder coatings.

The P and/or the PCC A when used in a PCC B—as each of them is described herein and as is defined by the claims—, the PCC B are storage stable, low bake and upon curing can provide matt powder coatings having good reverse impact resistance (RIR). More particularly, the PCC B are low bake, storage stable and upon curing provide matt powder coatings with good reverse impact resistance.

The polyester resin P, the crosslinker X, the binder K are associated with the PCC A and each of them is as described herein and as defined by the claims; sections 1-5 refer to the polyester resin P, the crosslinker X, the binder K and the PCC A; any feature, element, component, embodiment, range and especially any preferred feature, preferred element, preferred embodiment, preferred range, preferred combination of ranges, preferment described in sections 1-5 can be combined with each other.

The polyester resin P1, the crosslinker X1, the binder K1 are associated with the PCC A1 and each of them is as described herein and as defined by the claims; sections 6-8 refer to the polyester resin P1, the crosslinker X1, the binder K1 and the PCC A1; any feature, element, component, embodiment, range and especially any preferred feature, preferred element, preferred embodiment, preferred range, preferred combination of ranges, preferment described in sections 6-8 can be combined with each other.

The PCC B comprises a physical mixture of the PCC A and PCC A1 and each of them is as described herein and as defined by the claims; sections 9-12 refer to the PCC B; any feature, element, component, embodiment, range and especially any preferred feature, preferred element, preferred embodiment, preferred range, preferred combination of ranges, preferment described in sections 9-12 can be combined with each other.

Definitions

A "resin" is herein understood to have the same meaning as it has to a skilled person in thermosetting polymer chemistry, namely as a low molecular weight polymer having functional groups e.g. carboxylic acid functional groups ( . . . —COOH); the term "low molecular weight" means a theoretical number average molecular weight ($M_n$) lying between a few hundred Da, e.g. 1000 Da, and a few thousand Da, e.g. 15000 Da; preferably, the number of reactive groups per molecule is at least two. The resin is able to crosslink via reactions that involve its functional groups, said reactions are induced by means of heat and/or radiation, ultimately connecting the polymer chains together through the formation of permanent covalent (crosslink) bonds, resulting to a cured resin.

By "polymer" is meant herein a polymer having a theoretical number average molecular weight ($M_n$) higher than 15000 Da.

By "functional groups" is meant herein a covalently bonded group of atoms within a molecule, such as for example the carboxylic acid group in a carboxylic acid or the hydroxyl group in an alcohol or the oxirane group in an epoxy resin, that determines the chemical behaviour of said compound, are capable of reacting with functional groups of another molecule and are responsible for the characteristic chemical reactions of those molecules. In the case of a carboxylic acid functional polyester resin the functional groups of said polyester resin are predominantly carboxylic acid functional groups that behave as a unit in chemical reactions and said groups are capable of reacting with the functional groups of another molecule, for example a crosslinker such as an epoxy compound and/or an BHA compound. Typically in the case of a carboxylic acid functional polyester resin, the carboxylic acid functional groups are terminal groups (=end-groups) which are located at the end(s) of the polyester resin's macromolecular structure (including terminal groups on side chains which side chains form part of the main and longer—when compared to side chains—macromolecular chain) of each polyester resin molecule.

By "polyester resin" is meant herein a resin which is the reaction product of a polycondensation reaction between alcohols and carboxylic acids and/or derivatives of carboxylic acids such as carboxylic acid anhydrides and esters of carboxylic acids.

In reference to the monomers used for the preparation of a polyester resin, by the terms "monomers" or equally "monomers used for the preparation of a polyester resin" is meant herein the total of alcohols and the total of carboxylic acids and/or carboxylic acid anhydrides and/or esters of carboxylic acids, used for the preparation of said polyester resin. Obviously, the term "monomers" include the specific alcohols and carboxylic acids—as described herein and as defined by the claims—, for example monomers include but are not limited to the neopentyl glycol, the ethylene glycol, the $C_6$ diol, the polyol, the isophthalic acid, the terephthalic acid, the adipic acid, the polycarboxylic acid, the at least trifunctional monomer, that are used to prepare the polyester resins P and P1. The total of the alcohol functional compounds forms the "polyalcohol constituent" of the polyester resin and the total of the carboxylic acid functional compounds forms the "polyacid constituent" of the polyester resin. Thus, in the context of the invention a polyester resin is the reaction product of a polycondensation reaction between a polyalcohol constituent and a polyacid constituent. Any other reference to the terms "monomer" or "monomers" not associated to the monomers used for the preparation of a polyester resin, has the same meaning as it has to a skilled person in organic chemistry and polymer chemistry.

By "monomers used for the preparation of a polyester resin" is meant monomers reacted to produce said polyester resin, thus said reacted monomers represent the composition of said polyester resin.

By "mol % is based on a polyester resin" or equally "mol % based on a polyester resin" is meant herein the total amount of moles of monomers reacted to produce said polyester resin. For clarity, the total amount of monomers reacted to produce the polyester resin is (allowing for rounding errors) 100 mol %. For example the total amount of the specific alcohols and carboxylic acids—as described herein and as defined by the claims—that are used to prepare the polyester resins P and P1, and optionally any other alcohol and/or carboxylic acid that may be used to prepare the polyester resins P and P1, is 100 mol %. In the context of the invention, any reference to "mol %" is to be construed as "mol % is based on a polyester resin" or equally "mol % based on a polyester resin".

By "mono-alcohol" is meant herein an alcohol having one hydroxyl group.

By "diol" is meant herein an alcohol having two hydroxyl groups.

By "$C_6$ diol" is meant herein a diol having 6 carbon atoms in its chemical structure and/or a mixture of diols each of which has 6 carbon atoms in its chemical structure.

By "polyol" is meant herein an alcohol having at least 3 hydroxyl groups; preferably the polyol has at least three and at most 10 hydroxyl groups, more preferably the polyol has at least three and at most 8 hydroxyl groups, even more preferably the polyol has at least three and at most 6 hydroxyl groups, most preferably the polyol has at least three and at most 5 hydroxyl groups, especially the polyol has at least three and at most 4 hydroxyl groups, more especially the polyol has three hydroxyl groups or equally the polyol is a triol, for example the polyol is trimethylolpropane.

By "mono-carboxylic acid" is meant herein a carboxylic acid having one carboxylic acid group and/or said carboxylic acid's anhydride and/or an ester of a mono-carboxylic acid; preferably the mono-carboxylic acid is a carboxylic acid having one carboxylic acid group.

By "diacid" is meant herein a carboxylic acid having two carboxylic acid groups and/or said carboxylic acid's anhydride and/or a diester of a carboxylic acid; preferably the diacid is a carboxylic acid having two carboxylic acid groups and/or a mono-anhydride of a carboxylic acid; more preferably, the diacid is a carboxylic acid having two carboxylic acid groups.

By "polycarboxylic acid" is meant herein a carboxylic acid having at least three carboxylic acid groups and/or a carboxylic acid anhydride having at least one carboxylic acid anhydride group and one carboxylic acid group, and/or an ester of a carboxylic acid, having at least three ester groups. For clarity, a carboxylic acid anhydride group should be counted as two carboxylic acid groups; in the case of an ester of a carboxylic acid having at least three ester groups, each of the ester groups should be counted as one carboxylic acid group. Thus, in a polycarboxylic acid, the sum of carboxylic acid groups (counted as mentioned in this paragraph) should be at least three; for example a monomer having an anhydride group and a carboxylic acid group is, in the context of the present invention, a triacid. Preferably the polycarboxylic acid has at least 3 and at most 10 carboxylic acid groups, more preferably the polycarboxylic acid has at least three and at most 8 carboxylic acid groups, even more preferably the polycarboxylic acid has at least three and at most 6 carboxylic acid groups, most preferably the polycarboxylic acid has at least three and at most 5 carboxylic acid groups, especially the polycarboxylic acid has at least three and at most 4 carboxylic acid groups, more especially the polycarboxylic acid has three carboxylic acid groups or equally the polycarboxylic acid is a triacid, for example the polycarboxylic acid is a carboxylic acid anhydride having at least one carboxylic acid anhydride group and one carboxylic acid group, for example the polycarboxylic acid is trimellitic anhydride.

By "polyhydroxycarboxylic acid" is meant herein a monomer having at least one hydroxyl group and two carboxylic acid groups, or two hydroxyl groups and one carboxylic acid groups. In the context of the invention, a polyhydroxycarboxylic acid having more hydroxyl groups than carboxylic acid groups forms part of the polyalcohol constituent of a polyester resin; a polyhydroxycarboxylic acid having more carboxylic acid groups than hydroxyl groups forms part of the polyacid constituent of a polyester resin; a polyhydroxycarboxylic acid having an equal number of carboxylic acid groups and hydroxyl groups forms part of the polyacid constituent of a polyester resin.

By "an at least trifunctional monomer" is meant herein a monomer selected from the group consisting of a polyol, a polycarboxylic acid, a polyhydroxycarboxylic acid and mixtures thereof. Depending on the chemical nature of the functional groups of the at least trifunctional monomer, said trifunctional monomer forms part of either the polyalcohol constituent of a polyester resin or of the polyacid constituent of a polyester resin. If for example the at least trifunctional alcohol is a triol (trifunctional alcohol), then the triol forms part of the polyalcohol constituent of the polyester resin. If for example the at least trifunctional monomer is a triacid, then the triacid forms part of the polyacid acid constituent of the polyester resin. If for example the at least trifunctional monomer is a polyhydroxycarboxylic acid having two carboxylic acid groups and one hydroxyl group then the polyhydroxycarboxylic acid forms part of the polyacid acid constituent of the polyester resin.

By "branched" polyester resin is meant herein a polyester resin having a functionality (f) of at least 2.01 and of at most 10.

By "$M_n$" or equally "desired (targeted) $M_n$" is meant herein the theoretical number average molecular weight that is defined as follows:

$$M_n = (\Sigma_i N_i M_i)/(\Sigma_i N_i)$$

where $N_i$ is the number of molecules of molecular weight $M_i$. In the context of the invention, the $M_n$ is calculated by multiplying the functionality (f)—as defined herein—with 56110 and dividing the outcome thereof by the sum of the desired (targeted) acid value (AV) (mg KOH/g polyester resin) and the desired (targeted) hydroxyl value (OHV) (mg KOH/g polyester resin) according to the following equation EQ1:

$$M_n = (56110 \times f)/(AV+OHV) \quad (EQ1)$$

If the desired (targeted) values of AV, OHV are not available, then the $M_n$ can be calculated according to EQ1 by factoring in EQ1 the measured values of AV and OHV and wherein in this case f is calculated from analytical data on the chemical composition of the polyester resin, said analytical data being obtained from analytical techniques e.g. NMR spectroscopy, well-known to one skilled in the art.

The "functionality (f)" of a resin for example a polyester resin, of a desired (targeted) $M_n$ and a desired (targeted) acid value (AV) and a desired (targeted) hydroxyl value (OHV) is calculated herein according to the following equation EQ2:

$$f = [M_n \times (AV+OHV)]/56110 \quad (EQ2)$$

If the desired (targeted) values of AV, OHV are not available, then the f can be calculated from analytical data on the chemical composition of a resin, said analytical data being obtained from analytical techniques e.g. NMR spectroscopy, well-known to one skilled in the art.

The desired (targeted) AV of a resin for example a polyester resin is mentioned herein also as "theoretical AV" to distinguish it from the measured AV of a resin. The desired (targeted) OHV of a resin for example a polyester resin is mentioned herein also as "theoretical OHV" to distinguish it from the measured OHV of a resin.

Unless otherwise stated, the terms "acid value" (AV) and "hydroxyl value" (OHV) of a resin for example a polyester resin, refer to the measured AV and measured OHV, respectively, of a resin. The acid value (AV) of a polyester resin (mg KOH/g polyester resin) and hydroxyl value (OHV) of a polyester resin (mg KOH/g polyester resin) of the polyesters were measured titrimetrically according to ISO 2114-2000 and ISO 4629-1978, respectively. The acid value of a resin for example a polyester resin is a measure for the amount of carboxylic acid groups in the polyester resin whereas the hydroxyl value of a resin for example a polyester resin, is a measure for the amount of hydroxyl groups in the polyester resin.

By "viscosity" (q) or equally "viscosity (q)" or equally "viscosity" is meant herein the melt viscosity (in Pa.$) at 160° C. Viscosity measurements were carried out at 160° C., on a Brookfield CAP 2000+H Viscometer. The applied shear-rate was 21 s$^{-1}$ and a 19.05 mm spindle (cone spindle CAP-S-05 (19.05 mm, 1.8°) was used.

In the context of the invention with "carboxylic acid functional polyester resin" is meant a polyester resin which predominantly has carboxylic acid functional groups. A carboxylic acid functional polyester resin has an acid value that is higher than its hydroxyl value. Generally, a carboxylic acid functional polyester resin has an acid value between 14 and 120 mg KOH/g polyester resin whilst the hydroxyl value of the polyester resin is less than 13 mg KOH/g polyester resin. For clarity, the OHV of a hydroxyl functional polyester resin is higher than its AV. A carboxylic acid functional polyester resin may be prepared by selecting the synthesis conditions and the ratio of the polyalcohol constituent and polyacid constituent such that there is an excess of the polyacid constituent over the polyalcohol constituent.

In the context of the invention with "hydroxyl functional polyester resin" is meant a polyester resin which predominantly has hydroxyl functional groups. A hydroxyl functional polyester resin has a hydroxyl value that is higher than its acid value.

By "crosslinker" is meant herein a compound having functional groups that are reactable with the carboxylic acid functional groups of a polyester resin; a crosslinker may be a monomer or a resin or a polymer; preferably a crosslinker is a monomer or a resin.

By "crosslinker X" or equally "X" is meant herein a compound having functional groups that are reactable with the carboxylic acid functional groups of the polyester resin P; crosslinker X may be a monomer or a resin or a polymer; preferably crosslinker X is a monomer or a resin.

By "crosslinker X1" or equally "X1" is meant herein a compound having functional groups that are reactable with the carboxylic acid functional groups of the polyester resin P1; crosslinker X1 may be a monomer or a resin or a polymer; preferably crosslinker X1 is a monomer or a resin.

By "BHA compound" is meant herein a compound having at least two β-hydroxyalkylamide groups; for clarity the BHA compound is not a monomer used for the preparation of a polyester resin; the BHA compound may be a monomer or a resin or a polymer; preferably the BHA compound is a monomer or a resin, more preferably the BHA compound is a monomer.

By "epoxy compound" is meant herein a compound having at least two oxirane groups; for clarity the epoxy compound is not a monomer used for the preparation of a polyester resin; the epoxy compound may be a monomer or a resin or a polymer; preferably the epoxy compound is a monomer or a resin, more preferably the epoxy compound is a monomer.

By "binder" is meant herein the total of carboxylic acid functional polyester resins and the total of crosslinkers contained in a thermosetting powder coating composition; a binder is substantially dry; preferably a binder is solid at 23° C. and at atmospheric pressure (=1 atm). Preferably a binder is substantially dry and solid at 23° C. and at atmospheric pressure.

The terms "amorphous" and "crystalline" used to characterize a resin or a thermosetting powder coating composition, are informal terms used in the art to indicate the predominant character of the relevant resin or thermosetting powder coating composition, in respect to its degree of crystallinity but these terms are defined more precisely herein by melting enthalpy ($\Delta H_m$) values. The term "crystalline" denotes both crystalline and semi-crystalline.

By "amorphous" resin e.g. polyester resin or "amorphous" thermosetting powder coating composition, is meant herein that a resin or a thermosetting powder coating composition has a melting enthalpy ($\Delta H_m$) lower than 40, preferably lower than 35, more preferably lower than 30, even more preferably lower than 25, most preferably lower than 20, especially lower than 15, more especially lower than 10, even more especially lower than 5 J/g; most especially the amorphous resin or amorphous thermosetting powder coating composition has no melting enthalpy ($\Delta H_m$), that is to say that the amorphous resin or amorphous thermosetting powder coating composition does not have a melting temperature ($T_m$).

By "crystalline" resin e.g. polyester resin or "crystalline" thermosetting powder coating composition, is meant herein that a resin or a thermosetting powder coating composition has a melting enthalpy ($\Delta H_m$) of at least 40 J/g. In case in which a crystalline resin has a $T_g$, then its $T_g$ is lower than its $T_m$.

By "$T_g$" is meant herein the glass transition temperature. The $T_g$ is measured using DSC (Differential Scanning calorimetry) as described herein; in case a resin for example a polyester resin or a thermosetting powder coating composition has multiple glass transition temperatures then the $T_g$ recorded at the higher temperature is mentioned herein as $T_g$.

By "$T_m$" is meant herein the melting temperature; in case a resin for example a polyester resin or a thermosetting powder coating composition has multiple meltings then the $T_m$ of the melting with the largest melting enthalpy is mentioned herein as $T_m$. The $T_m$ is measured using DSC as described herein.

By "$\Delta H_m$" is meant herein the melting enthalpy. The ($\Delta H_m$) is measured using DSC as described herein. In case a resin for example a polyester resin has more than one melting peaks then the melting enthalpy ($\Delta H_m$) values mentioned herein, refer to the total of the melting enthalpy ($\Delta H_m$) said total obtained by summing up the $\Delta H_m$ values of each of the melting peaks.

The glass transition temperature, crystallization temperature, crystallization enthalpy, melting temperature and melting enthalpy of a polyester resin, measured via Differential Scanning calorimetry (DSC) as explained in the Examples in the sections entitled "DSC Method" and "DSC Method-PR".

The glass transition temperature, crystallization temperature, crystallization enthalpy, melting temperature and melting enthalpy of a thermosetting powder coating composition is measured via Differential Scanning calorimetry (DSC) as explained in the Examples in the sections entitled "DSC Method" and "DSC Method-TPCC".

By "composition" is meant herein the combining and/or mixture of distinct chemical substances and/or components to form a whole.

By "powder" is meant herein, a substantially dry solid substance at room temperature and at atmospheric pressure reduced to a state of fine, loose particles wherein the individual particles have preferably a maximum particle size of at most 200, more preferably of at most 180, even more preferably of at most 160, most preferably of at most 150, especially of at most 140, more especially of at most 130, most especially of at most 120, for example of at most 110, for example of at most 100, for example of at most 90 μm at 23° C. and at atmospheric pressure; the individual particles have preferably a minimum particle size of at least 10, more preferably of at least 15, even more preferably of at least 20, most preferably of at least 25, especially of at least 30, more especially of at least 35, most especially of at least 40, for example of at least 45, for example of at least 50, for example of at least 60, for example of at least 70 μm at 23° C. and at atmospheric pressure. A particle is defined as a small object that: a) has mean linear dimensions as described herein after and b) behaves as a whole unit in terms of its transport and properties. The particle size distribution (PSD) of a powder is a list of values or a mathematical function that defines the relative amounts of particles present, sorted according to size. The terms "particle size" and "particle size distribution" will be used interchangeably in the context of the invention when used in relation to a powder. The method used to measure the particle size of the thermosetting powder coating compositions of the invention is sieve analysis. According to it, the powder is separated on sieves of different sizes. Thus, the PSD is defined in terms of discrete size ranges: e.g. "weight % of sample powder has particle size in the range of 75 microns to 90 microns", when sieves of these sizes are used. Preferably, 90 weight % of the thermosetting powder coating composition of the invention has a particle size in the range of 20 to 200 micron. The PSD can be determined for example by the following method: a certain amount of thermosetting powder coating composition, for example 100 g, is brought onto a Fritsch Analysette Spartan sieving apparatus equipped with a 200 micron sieve. The sample is sieved for 15 minutes at a 2.5 mm amplitude. The fraction of the sample which remained on the sieve was weighed after sieving. The fraction of the sample that went through the sieve (sieved fraction) is collected and is placed on a 160 micron sieve and is sieved as mentioned herein above. Once the same measurements (weighing) are performed as mentioned herein above, the same procedure is repeated using sequentially a 140, a 125, a 112, a 100, a 90, a 75, a 50 and a 20 micron sieve; the last sieved fraction with a size smaller than 20 micron is also weighed. Summing up the various weight fractions, this should yield the initial amount of sample, in this example 100 g. The various weight fractions represent the PSD as a list of values representing the relative amounts of particles present, sorted according to sieves used.

By "substantially dry" is meant herein that a powder e.g. a thermosetting powder composition, or a polyester resin does not comprise any deliberately added organic solvent and/or aqeuous solvent e.g. water or moisture but the powder or the polyester resin may comprise moisture absorbed from the atmosphere in an amount of up to 30, preferably up to 20, more preferably up to 10, even more preferably up to 5, most preferably up to 3, especially up to 2, more especially up to 1% w/w based on the total weight of the thermosetting powder composition or that of the polyester resin.

By "thermosetting powder coating compositions" or "powders" is meant herein, a mixture of components in the form of a powder and which compositions have the ability to form an irreversible crosslinked network (the so-called "cured form" or "cured composition") upon curing, preferably via heat and/or radiation curing, more preferably via heat curing. For clarity, reference to any one of terms "thermosetting powder coating compositions" or "powders" is to be understood as uncured thermosetting powder coating compositions or equally uncured powders.

By "curing" or "cure" is meant herein the process of becoming "set" that is to form an irreversibly crosslinked network (the so-called "cured form" or "cured composition"), a material that can no longer flow, be melted or dissolved. Herein, the terms "curing" "cure" and "crosslinking" are used interchangeably. Preferably, the curing of the thermosetting powder coating composition of the invention takes place using heat and in that case the curing can be called "heat curing". For clarity, the term heat curing does not include ultraviolet (UV) or electron beam induced curing. Optionally, a combination of heat and pressure can be used to cure the heat-curable thermosetting powder coating compositions of the invention. In the context of the invention, the term "heat curing" does not exclude the application of pressure and/or vacuum along with heat in order to cure the heat-curable thermosetting powder coating compositions of the invention.

By "heat-curable thermosetting powder coating composition" is meant herein a thermosetting powder coating composition, said composition has the ability to cure upon heating. The thermosetting powder coating compositions described herein are heat-curable.

By "radiation-curable thermosetting powder coating composition" is meant herein a thermosetting powder coating composition, said composition has the ability to cure upon radiation i.e. UV and/or electron beam radiation. The thermosetting powder coating compositions described herein may be radiation-curable.

By "heat- and/or radiation-curable thermosetting powder coating composition" is meant herein a thermosetting powder coating composition, said composition has the ability to cure upon heat- and/or radiation i.e. UV and/or electron beam radiation. The thermosetting powder coating composition described herein may be heat- and/or radiation curable; preferably the thermosetting powder coating compositions described herein are heat-curable.

By "cured thermosetting powder coating composition" is meant herein an object that is derived upon partial or full curing of a thermosetting powder coating composition; said curing may be effected via heat and/or radiation, preferably via heat; said object may have any shape, size or form and it can for example be a film, coating; preferably the cured thermosetting powder coating composition is a powder coating.

By "powder coating" is meant herein the cured thermosetting powder coating composition in the form of a coating. A powder coating is derived upon curing of a thermosetting powder coating composition.

By "brown thermosetting powder coating compositions" is meant herein a thermosetting powder coating composition having brown colour and comprising a polyester resin, a crosslinker and a brown mixture.

By "brown mixture" is meant herein the brown mixture described in the Examples in the section entitled "Preparation of thermosetting powder coating compositions of Table 4: General procedure".

By "low bake thermosetting powder coating compositions" is meant herein brown thermosetting powder coating compositions that upon curing at 160° C. for 12 min, provide brown powder coatings having reverse impact resistance (RIR) of 40 in.-lb at a film thickness of 50±5 µm (1 µm=1×10$^{-6}$ m), as RIR is defined and measured herein.

By "thermosetting powder coating composition having good storage stability" is meant herein that a brown thermosetting powder coating composition has a physical storage stability (PSS) of at least 5, more preferably of at least 6, even more preferably of at least 7, on a scale from 1 (very poor storage stability) up to 10 (excellent storage stability), as the PSS is defined and measured herein.

By "matt powder coatings" or "equally "low gloss powder coatings" is meant herein a brown powder coating having a thickness of 60±5 µm that is obtained upon curing at 160° C. for 12 min of a brown thermosetting powder coating composition, said brown powder coating having a gloss 60° of at most 38, preferably of at most 36, more preferably of at most 35, as gloss 60° is defined and measured herein.

By "powder coating having good reverse impact resistance" is meant herein a brown powder coating having a thickness of 50±5 µm that is obtained upon curing at 160° C. for 12 min of a brown thermosetting powder coating composition, said brown powder coating is able to withstand at least 40, preferably at least 45, more preferably at least 50, even more preferably at least 55, most preferably at least 60 in.-lb (1 inch/lbs=0.055997 m/kg), as the reverse impact resistance (RIR) is defined and measured herein.

By "physical mixture" is meant herein what a skilled person in the art thermosetting powder coatings would understand, that is the elements of the mixture are brought and mixed together without: i) a substantial physical transformation and/or process that involves for example substantial melting, use of any liquid media e.g. organic solvent, water, able to solubilize or disperse the powders, and/or ii) chemical transformation and/or process that involves for example a chemical reaction, taking place. For example the physical blending of the elements of a mixture e.g. PCC A and PCC A1 are elements of PCC B, with a blender (mechanical mixing/blending) is viewed as a physical mixture according to the invention, whilst the melt-extrusion of the elements of a mixture e.g. PCC A and PCC A1 are elements of PCC B, (known also as co-extrusion), is viewed as a non-physical mixture.

By "one component thermosetting powder coating composition" or "1K thermosetting powder coating composition" or "1K system" is herein meant that all components of the thermosetting powder coating composition are melt-mixed e.g. via extrusion, and form part of one homogeneous powder.

By "two component thermosetting powder coating composition" or "2K thermosetting powder coating composition" or "2K system" is herein meant a thermosetting powder coating composition that comprises at least two separate, distinct powders with different chemical compositions; the at least two separate, distinct and different powders are each typically prepared via melt-mixing. The at least two separate, distinct and different powders are physically mixed via for example physical blending to afford the 2K thermosetting powder coating composition, before the latter either being stored or applied and cured onto an article.

By "components of a thermosetting powder coating composition" is meant herein constituent elements, their preferred embodiments and combinations thereof, that constitute part of the thermosetting powder coating composition of the invention; said components, their preferred embodiments and combinations thereof, should be construed in view of the whole disclosure.

Certain moieties, species, groups, repeat units, compounds, oligomers, polymers, materials, mixtures, compositions and/or formulations which comprise and/or are used in some or all of the invention as described herein may exist as one or more different forms such as any of those in the following non exhaustive list: stereoisomers (such as enantiomers (e.g. E and/or Z forms), diastereoisomers and/or geometric isomers); tautomers (e.g. keto and/or enol forms). The invention comprises and/or uses all such forms which are effective as defined herein.

By "(N)IR lamp" denotes herein both a near-IR lamp and an IR lamp.

By "lower than" is meant herein that the relevant maximum boundary value is not included in the range.

By "higher than" is meant herein that the relevant minimum boundary value is not included in the range.

The value "0" (zero) in any one of the ranges mentioned herein regarding amounts of monomers used for the preparation of polyester resins P and P1, components and/or compounds and/or ingredients of a composition denotes that said monomer, component and/or compound and/or ingredient does not need to be present in the relevant composition.

By "binder" is meant herein the total of one or more carboxylic acid functional polyester resins and one or more of crosslinkers.

By "pph" is meant herein weight parts per hundred weight parts.

By "pph binder" is meant herein weight parts per hundred weight parts of binder.

By "pph binder K" is meant herein weight parts per hundred weight parts of binder K.

By "pph binder K1" is meant herein weight parts per hundred weight parts of binder K1.

By "pph PCC A" is meant herein weight parts per hundred weight parts of PCC A.

By "pph PCC A1" is meant herein weight parts per hundred weight parts of PCC A1.

By "pph PCC B" is meant herein weight parts per hundred weight parts of PCC B.

By "room temperature" is meant herein a temperature of 23° C.

By "article" is meant herein an individual object or item or element of a class designed to serve a purpose or perform a special function and can stand alone; the article can be in any size, form or shape. A substrate is an example of an article. Preferably, said article is selected from the group consisting of heat-sensitive articles, non-heat sensitive articles and combinations thereof; more preferably said article is selected from the group of non-heat sensitive articles, even more preferably said article is selected from the group consisting of thermoplastic composite, thermoset composite, fibre reinforced composites, sandwich materials e.g. sandwich materials comprising heat sensitive foam core, metal and combinations thereof. Typical examples of non-heat-sensitive articles include glass, ceramic, composite, fibre cement board, or metal, for example aluminum, copper or steel articles, for instance carbon steel, where the main alloying constituent is carbon. Carbon steel usually contains carbon 0.2 and 1.5 w/w based on the total alloy composition and often contains other constituents such as manganese, chromium, nickel, molybdenum, copper, tungsten, cobalt, or silicon, depending on the desired steel properties. Steel has properties similar to iron if the amount of carbon is not too high, for example not more than 1.5% w/w based on the total alloy composition. The steel may be surface treated (treatment with zinc, or zinc phosphate or iron phosphate etc.) or non-surface treated. Heat-sensitive articles for example heat-sensitive substrates, include plastic articles, wood articles for example solid wood, such as for example: hard wood, soft wood, plywood; veneer, particle board, low density fibre board, medium density fibreboard and high density fibreboard, OSB (Oriented Strand Board) wood laminates, chipboard and other articles in which wood is an important constituent, such as for example foil covered wooden articles, engineered wood, plastic modified wood, plastic articles or wood plastic compounds (WPC); articles with cellulosic fibres, for example cardboard or paper articles; textile and leather articles. Examples of plastic articles include unsaturated polyester resin based compositions, ABS (acrylonitrile butadiene styrene), melamine-formaldehyde resins, polycarbonate, polyethylene, polypropylene, ethylene-propylene-diene monomer (EPDM), thermoplastic olefin (TPO), polyurethane (PU), polypropylene oxide (PPO), polyethylene oxide (PEO), polyethyleneterephthalate and nylon, for example polyamide 6,6 and combinations thereof, for example polycarbonate-ABS. Other heat-sensitive articles include objects that are a combination of a non-heat-sensitive part such as metal parts with a heat-sensitive part, such as any one of the aforementioned for example plastic hosing with heavy metal parts, strips for example aluminium frames with heat strips etc. The article can be a domestic furniture, such as tables, chairs, cabinets, etc., bedroom and bathroom furniture, office furniture, contract furniture such as school and child furniture, hospital furniture, restaurant and hotel furniture, kitchen cabinets and furniture, (flat) panels for interior design, interior and exterior windows and doors, interior and exterior window frames and door frames, exterior and interior sidings and flooring, articles for automotive applications, such as interior car parts, wheel covers, bumpers, under the hood parts etc., flexible flooring, sporting goods, cosmetics, audiovisual applications, such as TV sets, computer housing, phones, etc., household appliances and satellite dishes.

For all upper and lower boundaries of any parameters given herein, the boundary value is included in each range for each parameter. All combinations of minimum and maximum values of the parameters described herein may be used to define the parameter ranges for various embodiments and preferences of the invention.

In the context of the present invention unless stated to the contrary, the disclosure of alternative values for the upper or lower limit of the permitted range of a parameter, coupled with an indication that one of said values is more highly preferred than the other, is to be construed as an implied statement that each intermediate value of said parameter, lying in between the more preferred and the less preferred of said alternatives, is itself preferred to said less preferred value and also to each value lying between said less preferred value and said intermediate value.

The terms "effective", "acceptable", "active" and/or "suitable" (for example with reference to any process, use, method, application, preparation, product, material, formulation, compound, composition, monomer, oligomer, polymer precursor, and/or polymers of the present invention and/or described herein as appropriate) will be understood to refer to those features of the invention which if used in the correct manner provide the required properties to that which they are added and/or incorporated to be of utility as described herein. Such utility may be direct for example where a material has the required properties for the aforementioned uses and/or indirect for example where a material has use as a synthetic intermediate and/or diagnostic tool in preparing other materials of direct utility. As used herein these terms also denote that a functional group is compatible with producing effective, acceptable, active and/or suitable end products.

The term "comprising" as used herein means that the list that immediately follows is non-exhaustive and may or may not include any other additional suitable items, for example one or more further feature(s), component(s) and/or substituent(s) as appropriate. The term "comprising" will be used interchangeably with the term "containing". "Substantially comprising" or "essentially consisting of" as used herein means a component or list of component(s) is present in a given material in an amount greater than or equal to about 90% w/w, preferably greater than or equal to 95% w/w, more preferably greater than or equal to 98% w/w, even more preferably greater than or equal to 99% w/w of the total amount of the given material. The term "consisting of" as used herein mean that the list that follows is exhaustive and does not include additional items.

It will be understood that the total sum of any quantities expressed herein as percentages cannot (allowing for rounding errors) exceed 100%. For example the sum of all monomers of the polyester resins P and P1, binders K and K1, thermosetting powder coating compositions PCC A and PCC A1, as well as PCC B (or part(s) of each of the above thereof) comprises may, when expressed as a weight (or other) percentage of the polyester resins P and P1, binders K and K1, thermosetting powder coating compositions PCC A and PCC A1, as well as PCC B (or the same part(s) of each of the above thereof), total 100%, allowing for rounding errors. However where a list of monomers used for the preparation of polyester resins P and P1 or where a list of components of binders K and K1 or where a list of components of thermosetting powder coating compositions PCC A, PCC A1, PCC B is non-exhaustive, the sum of the percentage for each of such components may be less than 100% to allow a certain percentage for additional amount(s) of any additional component(s) that may not be explicitly described herein.

Unless the context clearly indicates otherwise, as used herein plural forms of the terms herein (for example monomer, polyester resin, binder, crosslinker, thermosetting powder coating composition, component, minute) are to be construed as including the singular form and vice versa.

DETAILED DESCRIPTION

1. Branched Carboxylic Acid Functional Polyester Resin P

In the context of the invention, the branched carboxylic acid functional polyester resin P is referred herein as "P" or equally as "polyester resin P". Preferably, the functional groups of the polyester resin P are carboxylic acid groups and/or carboxylic acid anhydride groups; more preferably the functional groups of the polyester resin P are carboxylic acid groups.

The polyester resin P may be prepared according to conventional condensation polymerization procedures by esterification or transesterification, optionally in the presence of customary esterification catalysts for example dibutyltin oxide, butyl stanoic acid or tetrabutyl titanate. The preparation conditions and the —COOH/—OH ratio may be selected so as to obtain polyester resins P that have an acid value and/or a hydroxyl value within a targeted range of values. Preferably the polyester resin P is prepared in bulk without the use of a solvent. The condensation polymerization reaction may occur at a temperature of from 100 to 350° C., preferably 290° C. or less, more preferably from 150 to 270° C. Reaction times may range from 2 to 96 hours, preferably less than 72 hours, more preferably less than 60 hours. The condensation polymerization reaction is preferably carried out in a reactor vessel (the term reactor vessel is used in the entire application interchangeably with the term reactor). The condensation polymerization reaction is preferably carried out in a nitrogen atmosphere. Preferably the reactions is carried out under vacuum to remove water produced during the condensation polymerization reaction whilst vacuum is typically applied at the last stage of the synthesis of a polyester resin P in order to achieve the desired specifications of the polyester resin P. Once prepared and while still in the reactor at temperatures in the range of 130 to 240° C., the polyester resin P is in a liquid state. The polyester resin P solidifies as soon as it is brought to a temperature below its glass transition temperature for example when the polyester resin P is discharged from a reactor onto a cooling belt which is kept at room temperature or lower temperatures or on a metal tray that may be at a room temperature or below. Typical temperatures of the cooling belt or tray are 15-25° C. A substantially dry polyester resin P can be isolated in any known way including direct discharge from a reactor, from a temperature as high as for example 205° C. and as low as 140° C., any known way of spray drying, freeze drying, flashing or through devolatization after the condensation polymerization reaction or combinations thereof.

The polyester resin P may be obtained in two-steps comprising mixing and reacting the polyacid constituent with excess of the polyalcohol constituent to form a hydroxyl functional polyester resin (precursor of the polyester resin P) at the end of the first step; next, the hydroxyl functional polyester resin is reacted further with excess of carboxylic functional monomers to obtain the polyester resin P.

Typically and depending on the reaction set up, one skilled in the art knows that an additional amount of alcohols e.g. diols, during the synthesis of a polyester resin such as a polyester resin P, may be necessary to compensate for alcohol losses that may take place during the synthesis of a polyester resin P; one skilled in the art knows and can easily calculate said amount of alcohols e.g. diols, given the experimental set up, the composition of the polyester resin P, said polyester resin's desired (targeted) AV and desired (targeted) OHV.

If desired, additives such anti-oxidants, flow additives, tribo additives can be added to the polyester resin P whilst the polyester resin P is in the reactor vessel and prior the polyester resin P is discharged as mentioned herein; this addition typically takes place at temperatures in the range of 170–195° C. or in the range of 160-210° C. If said additives are mixed within the polyester resin P, a reasonable amount of time to ensure proper mixing of the additive into the polyester resin P is carried out; for example the mixing can last from 15 to 60 min at temperatures in the range of 170–195° C.; subsequently, the polyester resin P is ready for being discharged.

The branched carboxylic acid functional polyester resin P, has:
a. a $T_g$ of at least 40° C. as measured by Differential Scanning calorimetry (DSC) at a heating rate of 5° C./min; and
b. an acid value (AV) of at least 65 and of at most 76.8 mg KOH/g P; and
c. a hydroxyl value of at most 10 mg KOH/g P; and
d. a functionality of at least 3.5 and of at most 5; and
said polyester resin P is the reaction product of at least the following monomers:
neopentyl glycol in an amount of 19-38 mol %; and
ethylene glycol in an amount of 8-21 mol %; and
a polyol in an amount of 0-2 mol %; and
isophthalic acid in an amount of 0-3 mol %; and
terephthalic acid in an amount of 38-47 mol %; and
adipic acid in an amount of 0.01-10 mol %; and
a polycarboxylic acid, in an amount of 6-10.2 mol %; and
wherein the mol % is based on the P and wherein the total amount of monomers used for the preparation of the polyester resin P is 100 mol %.

The polyester resin P may be amorphous or crystalline; preferably the polyester resin P is amorphous. Typically an amorphous polyester resin is characterized by a high degree of transparency (clarity).

The polyester resin P has an $M_n$ of at least 1000 and of at most 15000 Da. Preferably, the polyester resin P has an $M_n$ of at least 1200, more preferably of at least 1300, even more preferably of at least 1500, most preferably of at least 1600, especially of at least 1800, more especially of at least 2000, even more especially of at least 2100, most especially of at least 2200, for example of at least 2300, for example of at least 2400, for example of at least 2500, for example of at least 2600 Da. Preferably, the polyester resin P has an $M_n$ of at most 12000, more preferably of at most 10000, even more preferably of at most 9000, most preferably of at most 8000, especially of at most 7000, more especially of at most 6000, even more especially of at most 5500, most especially of at most 5000, for example of at most 4500, for example of at most 4200, for example of at most 4000, for example of at most 3800, for example of at most 3600, for example of at most 3400, for example of at most 3200, for example of at most 3000 Da.

The polyester resin P has a $T_g$ of at least 40° C. Preferably the polyester resin P has a $T_g$ of at least 45, more preferably of at least 48, more preferably of at least 50, even more preferably of at least 52, most preferably of at least 55, especially of at least 58, more especially of at least 59, most especially of at least 60° C. Preferably, the polyester resin P has a $T_g$ of at most 120, more preferably of at most 100, more preferably of at most 90, even more preferably of at most 85, most preferably of at most 80, especially of at most 78, more especially of at most 75, even more especially of at most 70° C.

The polyester resin P has an acid value (AV) of at least 65 and of at most 76.8 mg KOH/g P. Preferably, the polyester resin P has an acid value of at least 66, more preferably of at least 67, more preferably of at least 68, even more preferably of at least 69, most preferably of at least 70 mg KOH/g P. Preferably, the polyester resin P has an acid value of at most 76.5, more preferably of at most 76.2, more preferably of at most 76, even more preferably of at most 75.5, most preferably of at most 75 mg KOH/g P.

The polyester resin P has a hydroxyl value (OHV) of at most 10 mg KOH/g P. Preferably, the polyester resin P has a hydroxyl value of at least 0, more preferably of at least 0.01, more preferably of at least 0.05, even more preferably of at least 0.1, most preferably of at least 0.2, especially of at least 0.5 mg KOH/g P. The polyester resin P has preferably a hydroxyl value of at most 9, more preferably of at most 8, more preferably of at most 7, even more preferably of at most 6, most preferably of at most 5 mg KOH/g P. Preferably the polyester resin P has a hydroxyl value (OHV) of at least 0 and of at most 10, more preferably of at least 0 and of at most 8, even more preferably of at least 0 and of at most 6, most preferably more preferably of at least 0 and of at most 5 mg KOH/g P. Preferably the polyester resin P has a hydroxyl value (OHV) of at least 0.01 and of at most 10, more preferably of at least 0.01 and of at most 8, even more preferably of at least 0.01 and of at most 6, most preferably more preferably of at least 0.01 and of at most 5 mg KOH/g P.

The polyester resin P has a functionality of at least 3.5 and of at most 5. Preferably, the polyester resin P has a functionality of at least 3.52, more preferably of at least 3.6, more preferably of at least 3.7, even more preferably of at least 3.8, most preferably of at least 3.85. Preferably, the polyester resin P has a functionality of at most 4.9, more preferably of at most 4.8, more preferably of at most 4.6, even more preferably of at most 4.5, most preferably of at most 4.4, especially of at most 4.3, more especially of at most 4.2, even more especially of at most 4.1, most especially of at most 4.

Preferably, the polyester resin P has a viscosity of at most 150, more preferably of at most 125, most preferably of at most 100, for example of at most 80, for example of at most 75, for example of at most 70, for example of at most 65, for example of at most 60, for example of at most 55, for example of at most 50 for example of at most 40 for example of at most 30, for example of at most 25, for example of at most 20, for example of at most 15, for example of at most 10 for example of at most 5 for example of at most 3 Pa·s. Preferably, the polyester resin P has a viscosity of at least 0.001, more preferably of at least 0.01, even more preferably of at least 0.1, most preferably of at least 1, especially of at least 3, more especially of at least 5, even more especially of at least 8, most especially of at least 12, for example of at least 15, for example of at least 20, for example of at least 25, for example of at least 30 Pa·s.

In case in which the polyester resin P is amorphous, said amorphous polyester resin P has preferably a viscosity of at most 150, more preferably of at most 125, most preferably of at most 100, for example of at most 80, for example of at most 75, for example of at most 70, for example of at most 65, for example of at most 60, for example of at most 55 Pa·s. Preferably, the amorphous polyester resin P has a viscosity of at least 5, more preferably of at least 8, even more preferably of at least 12, most preferably of at least 15, especially of at least 20, more especially of at least 25, most especially of at least 30 Pa·s. Once prepared and while still in the reactor at temperatures in the range of 130 to 240° C., the amorphous polyester resin P is in a liquid state.

In case in which the polyester resin P is crystalline, said resin has preferably a melting temperature ($T_m$) of at least 30, more preferably of at least 40, more preferably of at least 50, most preferably of at least 60° C. In case in which the polyester resin P is crystalline, said resin has preferably a melting temperature ($T_m$) of at most 180, more preferably at most 160, even more preferably at most 140° C.

In case in which the polyester resin P is crystalline, said resin has preferably a crystallization temperature ($T_c$) of at least 30, more preferably of at least 40° C. In case in which the polyester resin P is crystalline, said resin has preferably a crystallization temperature ($T_c$) of at most 180, more preferably of at most 160, even more preferably of at most 140° C.

In case in which the polyester resin P is crystalline, said polyester resin has preferably a melting enthalpy ($\Delta H_m$) of at least 45, more preferably of at least 50, even more preferably of at least 55, most preferably of at least 60, especially of at least 65 J/g. In case in which the polyester resin P is crystalline, said polyester resin has preferably a melting enthalpy ($\Delta H_m$) of at most 400, more preferably of at most 300, most preferably of at most 260, especially of at most 240, more especially of at most 220, most especially of at most 200, for example of at most 180, for example of at most 160, for example of at most 140, for example of at most 130, for example at most 120 J/g.

In case in which the polyester resin P is crystalline, said crystalline polyester resin P has preferably a viscosity of at least 0.001, more preferably of at least 0.01, even more preferably of at least 0.1, Pa·s. Preferably, the crystalline polyester resin P has a viscosity of at most 100, more preferably of at most 50, even more preferably of at most 30, most preferably of at most 25, especially of at most 15, more especially of at most 10, most especially of at most 5, for example of at most 3 Pa·s. Preferably, the crystalline polyester resin P has a viscosity in the range of from 0.01 to 5 Pa·s.

Preferably, the polyester resin P is solid at 23° C. and at atmospheric pressure (=1 atm). Preferably the polyester resin P is substantially dry. Even more preferably the polyester resin P is substantially dry and solid at 23° C. and at atmospheric pressure.

The neopentyl glycol (2,2'-dimethyl-1,3-propanediol), used for the preparation of polyester resin P is in an amount of at least 19 and of at most 38 mol %. Preferably the neopentyl glycol used for the preparation of polyester resin P is in an amount of at least 20, more preferably in an amount of at least 22, even more preferably in an amount of at least 25, most preferably in an amount of at least 27, especially in an amount of at least 28, more especially in an amount of at least 29, most especially in an amount of at least 30 mol % based on the P. Preferably, the neopentyl glycol used for the preparation of polyester resin P is in an amount of at most 37.5, more preferably in an amount of at most 37, even more preferably in an amount of at most 36.5, most preferably in an amount of at most 36, especially in an amount of at most 35.5, more especially in an amount of at most 35, most especially in an amount of at most 34.5, for example in an amount of at most 34, for example in an amount of at most 33 mol % based on the P.

The ethylene glycol used for the preparation of polyester resin P is in an amount of at least 8 and of at most 21 mol %. Preferably the ethylene glycol used for the preparation of polyester resin P is in an amount of at least 8.5, more preferably in an amount of at least 9, even more preferably in an amount of at least 9.5, most preferably in an amount of at least 10, especially in an amount of at least 11, more especially in an amount of at least 12, most especially in an amount of at least 13, for example in an amount of at least 14, for example in an amount of at least 15 mol % based on the P. Preferably, the ethylene glycol used for the preparation of polyester resin P is in an amount of at most 20.5, more preferably in an amount of at most 20, even more preferably in an amount of at most 19.5, most preferably in an amount of at most 19, especially in an amount of at most 18.5, more especially in an amount of at most 18, most especially in an amount of at most 17.5 mol % based on the P.

The polyol used for the preparation of polyester resin P is in an amount of at least 0 and of at most 2 mol %. Preferably the polyol used for the preparation of polyester resin P is in an amount of at least 0.01, more preferably in an amount of at least 0.05, even more preferably in an amount of at least 0.1 mol % based on the P. Preferably, the polyol used for the preparation of polyester resin P is in an amount of at most 1.8, more preferably in an amount of at most 1.7, even more preferably in an amount of at most 1.6, most preferably in an amount of at most 1.4, especially in an amount of at most 1.3, more especially in an amount of at most 1.2, most especially in an amount of at most 1.1, for example in an amount of at most 1, for example in an amount of at most 0.9, for example in an amount of at most 0.8, for example in an amount of at most 0.7, for example in an amount of at most 0.6, for example in an amount of at most 0.5, for example in an amount of at most 0.4, for example in an amount of at most 0.3, for example in an amount of at most 0.2, for example in an amount of at most 0.15 mol % based on the P. Preferably, no polyol is used in the preparation of the polyester resin P. Examples of polyols that may be used in the preparation of the polyester resin P are trimethylolpropane, pentaerythritol, glycerol, dipentaerythritol, trimethylolethane. Preferably, the polyol used for the preparation of polyester resin P is selected from the group consisting of trimethylolpropane, glycerol, trimethylolethane and mixtures thereof; more preferably the polyol is trimethylolpropane.

The isophthalic acid used for the preparation of polyester resin P is in an amount of at least 0 and of at most 3 mol %. Preferably the isophthalic acid used for the preparation of polyester resin P is in an amount of at most 2.8, more preferably in an amount of at most 2.6, even more preferably in an amount of at most 2.4, most preferably in an amount of at most 2.2, especially in an amount of at most 2, more especially in an amount of at most 1.8, most especially in an amount of at most 1.6, for example in an amount of at most 1.4, for example in an amount of at most 1.2, for example in an amount of at most 1, for example in an amount of at most 0.9, for example in an amount of at most 0.8, for example in an amount of at most 0.7, for example in an amount of at most 0.5, for example in an amount of at most 0.3, for example in an amount of at most 0.2, for example in an amount of at most 0.1 mol % based on the P. Preferably, no isophthalic acid is used in the preparation of the polyester resin P.

The terephthalic acid used for the preparation of polyester resin P is in an amount of at least 38 and of at most 47 mol %. Preferably the terephthalic acid used for the preparation of polyester resin P is in an amount of at least 38.2, more preferably in an amount of at least 38.5, even more preferably in an amount of at least 38.8, most preferably in an amount of at least 39 mol % based on the P. Preferably the terephthalic acid used for the preparation of polyester resin P is in an amount of at most 46, more preferably in an amount of at most 45, even more preferably in an amount of at most 44, most preferably in an amount of at most 43, especially in an amount of at most 42, more especially in an amount of at most 41.5, most especially in an amount of at most 41, for example in an amount of at most 40.5, for example in an amount of at most 40 mol % based on the P.

The adipic acid used for the preparation of polyester resin P is in an amount of at least 0.01 and of at most 10 mol %. Preferably the adipic acid used for the preparation of polyester resin P is in an amount of at least 0.5, more preferably in an amount of at least 1, even more preferably in an amount of at least 1.5, most preferably in an amount of at least 2, especially in an amount of at least 2.5, more especially in an amount of at least 2.8, even more especially in an amount of at least 3, most especially in an amount of at least 3.2, for example in an amount of at least 3.4, for example in an amount of at least 3.5 mol % based on the P. Preferably, the adipic acid used for the preparation of polyester resin P is in an amount of at most 9, more preferably in an amount of at most 8, even more preferably in an amount of at most 7, most preferably in an amount of at most 6, especially in an amount of at most 5.5, more especially in an amount of at most 5, most especially in an amount of at most 4.5, for example in an amount of at most 4, for example of at most 3.9 mol % based on the P.

The polycarboxylic acid used for the preparation of polyester resin P is in an amount of at least 6 and of at most 10.2 mol %. Preferably the polycarboxylic acid used for the preparation of polyester resin P is in an amount of at least 6.5, more preferably in an amount of at least 7, even more preferably in an amount of at least 7.5, most preferably in an amount of at least 7.6, especially in an amount of at least 7.7, more especially in an amount of at least 7.8 mol % based on the P. Preferably, the polycarboxylic acid used for the preparation of polyester resin P is in an amount of at most 10, more preferably in an amount of at most 9.5, even more preferably in an amount of at most 9.2, most preferably in an amount of at most 9, especially in an amount of at most 8.9, more especially in an amount of at most 8.8 mol % based on the P. Examples of polycarboxylic acids that may be used in the preparation of the polyester resin P are trimellitic anhydride (TMA), pyromellitic anhydride, trimesic acid and citric acid. Preferably, the polycarboxylic acid used for the preparation of polyester resin P is TMA.

Apart from neopentyl glycol and ethylene glycol, other diols that can be used for the preparation of the polyester resin P include but are not limited to: diethylene glycol, triethylene glycol, 1,2-propylene glycol, 1,3-propylene glycol, 1,3-butylethyl propanediol, 2-butyl-2-ethyl-1,3-propanediol (BEPD), 2-methyl-1,3-propanediol (MP diol), 1,2-butylene glycol, 1,3-butylene glycol, 1,4-butylene glycol, 1,3-isobutanediol, 1,2-isobutanediol, 2,3-butanediol, 2-butenediol(1,4), 2,2,4-trimethyl-1,3-pentanediol, 1,2-cyclopentanediol, 1,3-cyclopentanediol, 1,4-cyclopentanediol, 1,6-hexanediol, 1,4-dimethoxy cylcohexane, 1,2-cyclohexanediol, 1,3-cyclohexanediol, 1,4-cyclohexanediol, 1,4-cyclohexanedimethanol, 4,4'-methylene-bis(cyclohexanol), 4,4'-isopropylidene-bis(cyclohexanol), (hydrogenated bisphenol A) 1,4-bis(hydroxymethyl)cyclohexane, 1,3-bis(hydroxyethyl) cyclohexane, 1,3-bis(hydroxypropyl) cyclohexane, 1,3-bis(hydroxyisopropyl) cyclohexane, dodecanediol, xylene glycol, bisphenol A/propylene oxide adducts, hydroquinone/propylene oxide adducts, and hydroquinone/ethylene oxide adducts.

Apart from isophthalic acid, terephthalic acid and adipic acid other diacids can be used for the preparation of the polyester resin P include but are not limited to: 2,6-naphtalene dicarboxylic acid, 4,4'-oxybisbenzoic acid, tetrahydrophthalic anhydride, cyclohexanedicarboxylic acid, succinic acid, sebacid acid, phthalic anhydride, maleic anhydride, fumaric acid, itaconic acid.

Any feature, element, component, embodiment, range and especially any preferred feature, preferred element, preferred embodiment, preferred range, preferred combination of ranges, preferment described in section 1 can be combined with each other.

2. Thermosetting Powder Coating Composition A (PCCA)

The PCC A is as described in the entire application and as defined by the claims.

The PCC A is a one component thermosetting powder coating composition.

The PCC A can be a heat-curable and/or radiation curable thermosetting powder coating composition; preferably the PCC A is a heat-curable thermosetting powder coating composition.

The PCC A can be amorphous or crystalline; preferably the PCC A is amorphous.

The thermosetting powder coating composition A (PCC A) comprises a binder K in an amount of at least 10 and of at most 100 pph PCC A, said binder K comprising a polyester resin P and a crosslinker X.

Preferably the PCC A comprises a binder K in an amount of at least 15, more preferably of at least 20, even more preferably of at least 30, most preferably of at least 35, especially of at least 40, more especially of at least 45, even more especially of at least 50, most especially of at least 60, for example of at least 70, for example of at least 75, for example of at least 80, for example of at least 85, for example of at least 90, for example of at least 92, for example of at least 94, for example of at least 96, for example of at least 97, for example of at least 98, for example of at least 99 pph PCCA. Preferably the PCC A comprises a binder K in an amount of at most 99, more preferably of at most 98, even more preferably of at most 97, most preferably of at most 96, especially of at most 94, more especially of at most 92, even more especially of at most 90, most especially of at most 85, for example of at most 80, for example of at most 75, for example of at most 70, for example of at most 60, for example of at most 50, for example of at most 45, for example of at most 40, for example of at most 35, for example of at most 30, for example of at most 20, for example of at most 15 pph PCCA.

The binder K comprises a polyester resin P in an amount of at least 10 and at most 99 pph binder K. Preferably, the binder K comprises a P in an amount of at least 15, more preferably in an amount of at least 20, even more preferably in an amount of at least 25, most preferably of at least 30, especially in an amount of at least 35, more especially in an amount of at least 40, even more especially in an amount of at least 45 most especially in an amount of at least 50 pph binder K. Preferably, the binder K comprises a P in an amount of at most 98, more preferably in an amount of at most 97, even more preferably in an amount of at most 95, most preferably of at most 93, especially in an amount of at most 92, more preferably in an amount of at most 90, even more especially in an amount of at most 85, most especially in an amount of at most 80, for example in an amount of at most 75, for example in an amount of at most 70, for example in an amount of at most 65, for example in an amount of at most 60, for example in an amount of at most 55, for example in an amount of at most 50 pph binder K.

The binder K comprises a crosslinker X in an amount of at least 1 and at most 90 pph binder. Preferably, the binder K comprises a X in an amount of at least 2, more preferably in an amount of at least 3, even more preferably in an amount of at least 5, most preferably of at least 7, especially in an amount of at least 6, more especially in an amount of at least 8, even more especially in an amount of at least 9, most especially in an amount of at least 10, for example in an amount of at least 11, for example in an amount of at least 12, for example in an amount of at least 13, for example in an amount of at least 14, for example in an amount of at least 15, for example in an amount of at least 20, for example in an amount of at least 25, for example in an amount of at least 30, for example in an amount of at least 35, for example in an amount of at least 40, for example in an amount of at least 45, for example in an amount of at least 50 pph binder K. Preferably, the binder K comprises a X in an amount of at most 85, more preferably in an amount of at most 80, even more preferably in an amount of at most 75, most preferably of at most 70, especially in an amount of at most 65, more especially in an amount of at most 60, even more especially in an amount of at most 55, most especially in an amount of at most 50, for example in an amount of at most 45, for example in an amount of at most 40, for example in an amount of at most 35, for example in an amount of at most 30, for example in an amount of at most 25, for example in an amount of at most 20, for example in an amount of at most 18, for example in an amount of at most 16, for example in an amount of at most 15, for example in an amount of at most 14, for example in an amount of at most 13, for example in an amount of at most 12 for example in an amount of at most 10, for example in an amount of at most 9, for example in an amount of at most 8, for example in an amount of at most 7 for example in an amount of at most 5 for example in an amount of at most 3, for example in an amount of at most 2 for example in an amount of at most 1 pph binder K.

Preferably, the crosslinker X is selected from the group consisting of BHA compounds, epoxy compounds and mixtures thereof; more preferably the crosslinker X is selected from the group consisting of BHA compounds and epoxy compounds; even more preferably the crosslinker X is selected from the group consisting of BHA compounds or equally the crosslinker X is a BHA compound.

Preferably the BHA compound has at least 3 β-hydroxyalkylamide groups, even more preferably the BHA compound has at least 4 β-hydroxyalkylamide groups, most preferably the BHA compound has at least 2 and at most 4 β-hydroxyalkylamide groups, especially the BHA compound has at least 3 and at most 4 β-hydroxyalkylamide groups, more especially the BHA compound has 4 β-hydroxyalkylamide groups.

Some BHA compounds are disclosed in U.S. Pat. Nos. 4,727,111, 4,788,255, 4,076,917, EP 322834 and EP 473380.

Suitable examples of commercially available BHA compounds are for example N,N,N',N'-tetrakis-(2-hydroxyethyl)-adipamide (Primid® XL-552) and N,N,N',N'-tetrakis-(2-hydroxypropyl)-adipamide (Primid® QM 1260) available from EMS Chemie AG. Primid® XL-552 is an example of a BHA compound having 4 β-hydroxyalkylamide groups.

If the crosslinker X is a BHA compound, then the binder K comprises a BHA compound preferably in an amount of at least 2, more preferably in an amount of at least 3, even more preferably in an amount of at least 4, most preferably in an amount of at least 5, especially in an amount of at least 6, more especially in an amount of at least 7, even more especially in an amount of at least 8, most especially in an amount of at least 9, for example in an amount of at least 10 pph binder K. If the crosslinker X is a BHA compound, then the binder K comprises a BHA compound preferably in an amount of at most 25, more preferably in an amount of at most 20, even more preferably in an amount of at most 18, most preferably in an amount of at most 16, especially in an amount of at most 15, more especially in an amount of at most 14, even more especially in an amount of at most 13 pph binder K. Preferably, if the crosslinker X is a BHA compound, then the binder K comprises a crosslinker X in an amount of at least 9 and of at most 13 pph binder K.

If the crosslinker X is a BHA compound, then the binder K comprises a polyester resin P preferably in an amount of at least 75, more preferably in an amount of at least 80, even more preferably in an amount of at least 82, most preferably in an amount of at least 84, especially in an amount of at least 85, more especially in an amount of at least 86, even more especially in an amount of at least 87, most especially in an amount of at least 88, for example in an amount of at least 90, for example in an amount of at least 91 pph binder K. If the crosslinker X is a BHA compound, then the binder K comprises a polyester resin P preferably in an amount of at most 98, more preferably in an amount of at most 97, even more preferably in an amount of at most 96, most preferably in an amount of at most 95, especially in an amount of at most 94, more especially in an amount of at most 93, even more especially in an amount of at most 92, most especially in an amount of at most 91, for example in an amount of at most 90, for example in an amount of at most 88, for example in an amount of at most 87 pph binder K. Preferably, if the crosslinker X is a BHA compound, then the binder K comprises a polyester resin P in an amount of at least 87 and of at most 91 pph binder K.

Suitable examples of epoxy compounds include bisphenol-A resins, bisphenol-F epoxy resins, glycidylesters, triglycidylisocyanurates and combinations thereof. It is preferred to use a an epoxy compound chosen from the group consisting of bisphenol-A resins, bisphenol-F epoxy resins, glycidylesters and combinations thereof. More preferably, the epoxy compound is chosen from the group consisting of bisphenol-A resins, glycidylesters and combinations thereof. Suitable examples of commercially available bisphenol-A epoxy resins include Araldite® GT-7004 (Huntsman), Epikote® 1002 (Shell) and DER 662®, DER 663® and DER 664® (Dow). Suitable examples of commercially available glycidylesters include Araldite® PT910 and Araldite® PT912. Examples of triglycidylisocyanurates include TGIC, which is commercially available as Araldite® PT810. Preferably, the epoxy compound is a bisphenol-A epoxy resin, e.g. Araldite® GT-7004.

The epoxy compounds can vary considerably in molecular weight. This is most often expressed as the epoxy equivalent weight (EEW). The epoxy equivalent weight is the weight of an epoxy compound containing exactly one mole of epoxy groups, expressed in g/mol. Preferably the EEW ranges from 100 to 1500, more preferably from 150 to 1200, even more preferably from 200 to 900 and most preferably from 400 to 850 g/mol.

If the crosslinker X is an epoxy compound, then the binder K comprises an epoxy compound preferably in an amount of at least 2, more preferably in an amount of at least 3, even more preferably in an amount of at least 4, most preferably in an amount of at least 5, especially in an amount of at least 6, more especially in an amount of at least 7, even more especially in an amount of at least 8, most especially in an amount of at least 9, for example in an amount of at least 10, for example in an amount of at least 11, for example in an amount of at least 12, for example in an amount of at least 13, for example in an amount of at least 14, for example in an amount of at least 20, for example in an amount of at least 25, for example in an amount of at least 30, for example in an amount of at least 35, for example in an amount of at least 40, for example in an amount of at least 45 pph binder K. If the crosslinker X is an epoxy compound, then the binder K comprises an epoxy compound preferably in an amount of at most 70, more preferably in an amount of at most 65, even more preferably in an amount of at most 60, most preferably in an amount of at most 55, especially in an amount of at most 50, more especially in an amount of at most 45 pph binder K.

If the crosslinker X is an epoxy compound, then the binder K comprises a polyester resin P preferably in an amount of at least 40, more preferably in an amount of at least 45, even more preferably in an amount of at least 50 pph binder K. If the crosslinker X is an epoxy compound, then the binder K comprises a polyester resin P preferably in an amount of at most 98, more preferably in an amount of at most 97, even more preferably in an amount of at most 96, most preferably in an amount of at most 95, especially in an amount of at most 94, more especially in an amount of at most 93, even more especially in an amount of at most 92, most especially in an amount of at most 91, for example in an amount of at most 90, for example in an amount of at most 89, for example in an amount of at most 88, for example in an amount of at most 87, for example in an amount of at most 86, for example in an amount of at most 80, for example in an amount of at most 75, for example in an amount of at most 70, for example in an amount of at most 65, for example in an amount of at most 60, for example in an amount of at most 55, for example in an amount of at most 50 pph binder K.

If the crosslinker X is an epoxy compound, preferably the PCC A comprises a catalyst to promote the crosslinking reaction of the crosslinker X with the polyester P. Suitable catalysts include amine containing compounds, such as tertiary amines, phosphines, imidazoles, quaternary ammonium salts, phosphonium salts, metal salts. Specific samples of these catalysts are tetrabutylammonium and choline chloride. These catalysts may be used either alone or in combination.

The glass transition temperature ($T_g$) of the PCC A is preferably at least 23, more preferably at least 25, even more preferably at least 35, most preferably at least 40, especially at least 45° C. The glass transition temperature ($T_g$) of the PCC A is preferably at most 100° C., more preferably at most 90° C., even more preferably at most 80° C., most preferably at the most 70° C.

In case in which the PCC A has a $T_m$, the $T_m$ is preferably at least 23, more preferably at least 25, even more preferably at least 30, most preferably at least 40, especially at least 45, most preferably at least 50° C. The Tri, of the PCC A is preferably at most 180° C., more preferably at most 160° C., even more preferably at most 150, most preferably at most 140° C.

As is apparent to the skilled person, besides a polyester resin P, also other resins different than polyester resins P, for example other carboxylic acid functional polyester resins different than polyester resin P, may be present in the binder K; said resins different than polyester resins P can be amorphous or crystalline, preferably said resins are amorphous. Preferably, the amount of a polyester resin P in the binder K is at least 90, preferably at least 93, more preferably at least 95, even more preferably at least 97, most preferably at least 98, especially at least 99 and more especially 100% w/w based on total amount of resins present in the binder K. Preferably, the binder K comprises —apart from a crosslinker X—, only a polyester resin P, as a carboxylic acid functional resin, because this offers simplicity in formulating.

It is advantageous to use only a polyester resin P in the PCC A as the use of only one resin as opposed to a mixture of resins in the PCC A is less laborious and economically more attractive.

The PCC A may further comprise waxes, pigments, fillers and/or the usual (processing) additives, for example degassing agents, smoothness, appearance enhancing agents or (light) stabilizers. The pigments may be inorganic or organic. Suitable inorganic pigments include for example, titanium dioxide, zinc sulphide, zinc phosphate, mica, iron oxide and/or chromium oxide. Suitable organic pigments include for example azo compounds. Suitable fillers include for example metal oxides, silicates, carbonates and sulphates. Suitable stabilizers include for example primary and/or secondary antioxidants and UV stabilizers for example quinones, (sterically hindered) phenolic compounds, phosphonites, phosphites, thioethers and HALS (hindered amine light stabilizers). Examples of suitable degassing agents include cyclohexane dimethanol bisbenzoate, benzoin and benzoin derivatives such as for example those described in WO02/50194. Other additives, such as additives for improving tribo-chargeability may also be added. Some of these additives may be added after the polyester resin P is prepared in a chemical reactor but before the polyester resin P is discharged from the chemical reactor. Alternatively, some of these additives may be added in the premix of the thermosetting powder coating composition as described above or in the extruder for instance by liquid injection.

Any feature or preferred combination of features or preferred combination of ranges disclosed in the present invention and regard the polyester resin P, the crosslinker X, the binder K and the PCC A can be combined with each other.

Any feature, element, component, embodiment, range and especially any preferred feature, preferred element, preferred embodiment, preferred range, preferred combination of ranges, preferment described in section 2 can be combined with each other.

3. Process for Making the PCC A

The PCC A may be prepared by mixing the separately weighed-out components in a mixer, heat the obtained premix, for example in a kneader, preferably in an extruder to obtain an extrudate, cool down the obtained extrudate until it solidifies and grind it into granules or flakes that are further ground to reduce the particle size followed by appropriate classification to obtain a thermosetting powder coating composition of the right particle size.

Alternatively, the PCC A may be prepared by mixing the separately weighed-out crosslinker X with polyester resin P to form a premix, heat the obtained premix, for example in a kneader, preferably in an extruder to obtain an extrudate, cool down the obtained extrudate until it solidifies and grind it into granules or flakes that are further ground to reduce the particle size. Subsequently, mixing the rest of the separately weighed-out components and the extrudate of the crosslinker X with the polyester resin P to form another premix, heat the thus obtained premix, for example in a kneader, preferably in an extruder to obtain an extrudate, cool down the obtained extrudate until it solidifies and grind it into granules or flakes that are further ground to reduce the particle size followed by appropriate classification to obtain a thermosetting powder coating composition of the right particle size.

Preferably, the PCC A is prepared by a process comprising the steps of:
a. mixing the components of the PCC A to obtain a premix;
b. heating the premix, preferably in an extruder, to obtain an extrudate;
c. cooling down the extrudate to obtain a solidified extrudate; and
d. grinding the solidified extrudate into smaller particles to obtain the PCC A.

If the premix is heated in an extruder or mixer/kneader, it is preferred to use a temperature control in order to avoid too high temperatures that could lead to curing of the PCC A in the extruder. The temperature should be set so that a good mixing is ensured by melting/kneading/mixing of all components to get a homogeneous mass.

Preferably, the PCC A is prepared by a process comprising the steps of:
a. mixing the crosslinker X with the polyester resin P to obtain a premix 1;
b. heating the premix 1, preferably in an extruder, to obtain an extrudate of the crosslinker X with the polyester resin P, namely extrudate 1;
c. cooling down the extrudate 1 to obtain a solidified extrudate 1; and
d. grinding the solidified extrudate 1 into smaller particles to obtain a mixture of the crosslinker X with the polyester resin P, namely mixture 1; and
e. mixing the rest of the components of the PCC A with the mixture 1, to obtain a premix 2;
f. heating the premix 2, preferably in an extruder, to obtain an extrudate 2;
g. cooling down the extrudate 2 to obtain a solidified extrudate 2; and
h. grinding the solidified extrudate 2 into smaller particles to obtain the PCC A.

If the premix 1 and/or 2 is/are heated in an extruder or mixer/kneader, it is preferred to use a temperature control in order to avoid too high temperatures that could lead to curing of the PCC A in the extruder. The temperature should be set so that a good mixing is ensured by melting/kneading/mixing of all components to get a homogeneous mass.

Any feature, element, component, embodiment, range and especially any preferred feature, preferred element, preferred embodiment, preferred range, preferred combination of ranges, preferment described in section 3 can be combined with each other.

4. Cured Thermosetting Powder Coating Composition A and Process for Curing the PCC A and Object Obtainable by and/or Obtained by Said Process Broadly in accordance with the invention there is provided a cured thermosetting powder coating composition A, as the thermosetting powder coating composition A is described herein. The cured thermosetting powder coating composition A, is derived upon curing of the thermosetting powder coating composition A, as the thermosetting powder coating composition A is described herein. Preferably the cured thermosetting powder coating composition A is a powder coating, said powder coating can be a primer, top coat or an intermediate coating.

Broadly in accordance with the invention there is provided a process for curing the PCC A comprising the steps of:
i) providing the PCC A; and
ii) heating and/or radiating the PCC A to partially or fully cure it.

Preferably step ii) above is carried out via heating.

Broadly in accordance with the invention there is provided an object obtainable and/or obtained by the aforementioned process for curing the PCC A; said object is the cured thermosetting powder coating composition A and said cured thermosetting powder coating composition A is preferably a powder coating, said powder coating can be a primer, top coat or an intermediate coating.

In case of heating the PCC A in order to cure it, the heating of the PCC A can be carried out at a temperature and for a time suitable to cure the thermosetting powder coating composition of the invention.

Heating of the PCC A may be done using conventional methods, such as with a convection oven and/or with an (N)IR lamp and/or infrared laser and/or microwave equipment may be used to heat the PCC A.

The temperature, at which the PCC A is cured, is preferably in the range of 120 to 225° C., more preferably from 130 to 200° C., even more preferably from 130 to 190° C., most preferably from 130 to 180° C., especially from 130 to 170° C., more especially from 130 to 160° C. Preferably, the temperature at which the PCC A is cured is preferably at most 225, more preferably at most 200, even more preferably at most 190, most preferably at most 180, most preferably at most 170, especially at most 160, more especially at most 150° C. Preferably, the temperature at which the thermosetting powder coating compositions of the invention are cured, is preferably at least 120, more preferably at least 130, even more preferably at least 135, most preferably at least 140, most preferably at least 145, especially at least 150, more especially at least 155° C.

Preferably the curing time of the PCC A is at most 60, more preferably is at most 45, even more preferably is at most 30, most preferably is at most 20, especially is at most 15, more especially is at most 12, even more especially is at most 10, most especially is at most 5 minutes.

Preferably the PCC A is cured at a temperature in the range of 130-180° C. for a time in the range of 5-30 minutes, more preferably the PCC A is cured at a temperature in the range of 130-170° C. for a time in the range of 5-30 minutes.

Any feature, element, component, embodiment, range and especially any preferred feature, preferred element, preferred embodiment, preferred range, preferred combination of ranges, preferment described in section 4 can be combined with each other.

5. Process for Coating an Article with the PCC A and a Process for Coating and Curing an Article Having the PCC A Coated and Cured Thereon Broadly in accordance with the invention there is provided a process for coating an article with the PCC A comprising the step of applying the PCC A to an article as said article is defined herein, to obtain the coated article.

Broadly in accordance with the invention there is provided a process for making an article having coated and cured thereon a thermosetting powder coating composition A, comprising the steps of:
a. applying the PCC A to an article as said article is defined herein;
b. heating and/or radiating the thermosetting powder coating composition for enough time (curing time) and at a suitable temperature to partially or fully cure (curing temperature) the PCC A to obtain the article having coated and cured thereon the thermosetting powder coating composition A.

Preferably, step b. above is carried out via heating.

The PCC A may be applied to an article using the techniques known to the person skilled in the art, for example using electrostatic spray or electrostatic fluidized bed or flame spray.

Heating of the coated substrate may be done using conventional methods, such as with a convection oven and/or with an (N)IR lamp. Even microwave equipment may be used to heat the substrate.

The temperature, at which the PCC A is cured, is preferably in the range of 120 to 225° C., more preferably from 130 to 200° C., even more preferably from 130 to 190° C., most preferably from 130 to 180° C., especially from 130 to 170° C., more especially from 130 to 160° C. Preferably, the temperature at which the PCC A is cured is preferably at most 225, more preferably at most 200, even more preferably at most 190, most preferably at most 180, most preferably at most 170, especially at most 160, more especially at most 150° C. Preferably, the temperature at which the thermosetting powder coating compositions of the invention are cured, is preferably at least 120, more preferably at least 130, even more preferably at least 135, most preferably at least 140, most preferably at least 145, especially at least 150, more especially at least 155° C.

Preferably the curing time of the PCC A is at most 60, more preferably is at most 45, even more preferably is at most 30, most preferably is at most 20, especially is at most 15, more especially is at most 12, even more especially is at most 10, most especially is at most 5 minutes.

Preferably the PCC A is cured at a temperature in the range of 130-170° C. for a time in the range of 5-30 minutes.

Any feature, element, component, embodiment, range and especially any preferred feature, preferred element, preferred embodiment, preferred range, preferred combination of ranges, preferment described in section 5 can be combined with each other.

6. Branched Carboxylic Acid Functional Polyester Resin P1

In the context of the invention, the branched carboxylic acid functional polyester resin P1 used in PCC A1, is referred herein as "P1" or equally as "polyester resin P1". Preferably, the functional groups of the polyester resin P1 are carboxylic acid groups and/or carboxylic acid anhydride groups; more preferably the functional groups of the polyester resin P1 are carboxylic acid groups.

The polyester resin P1 may be prepared according to conventional condensation polymerization procedures by esterification or transesterification, optionally in the presence of customary esterification catalysts for example dibutyltin oxide, butyl stanoic acid or tetrabutyl titanate. The preparation conditions and the —COOH/—OH ratio may be selected so as to obtain polyester resins P1 that have an acid value and/or a hydroxyl value within a targeted range of values. Preferably the polyester resin P1 is prepared in bulk without the use of a solvent. The condensation polymerization reaction may occur at a temperature of from 100 to 350° C., preferably 290° C. or less, more preferably from 150 to 270° C. Reaction times may range from 2 to 96 hours, preferably less than 72 hours, more preferably less than 60 hours. The condensation polymerization reaction is preferably carried out in a reactor. The condensation polymerization reaction is preferably carried out in a nitrogen atmosphere. Preferably the final part of the reaction is carried out under vacuum to remove water produced during the condensation polymerization reaction. Once prepared and while still in the reactor at temperatures in the range of 130 to 240° C., the polyester resin P1 is in a liquid state. The polyester resin P1 solidifies as soon as it is brought to a temperature below its glass transition temperature for example when the P1 resin is discharged from a reactor onto a cooling belt which is kept at room temperature or lower temperatures or on a metal tray that may be at a room temperature or below. Typical temperatures of the cooling belt or tray are 15-25° C. A substantially dry polyester resin P1 can be isolated in any known way including direct discharge from a reactor, from a temperature as high as for example 180° C. to ambient temperature for example 23° C., any known way of spray drying, freeze drying, flashing or through devolatization after the condensation polymerization reaction or combinations thereof.

The polyester resin P1 may be obtained in two-steps comprising mixing and reacting the polyacid constituent with excess of the polyalcohol constituent to form a hydroxyl functional polyester resin (precursor of the polyester resin P1) at the end of the first step; next, the hydroxyl functional polyester resin is reacted further with excess of carboxylic functional monomers to obtain the polyester resin P1.

Typically and depending on the reaction set up, one skilled in the art knows that an additional amount of alcohols e.g. diols, during the synthesis of a polyester resin such as a polyester resin P1, may be necessary to compensate for alcohol losses that may take place during the synthesis of a polyester resin P1; one skilled in the art knows and can easily calculate said amount of alcohols e.g. diols, given the experimental set up, the composition of the polyester resin P1, said polyester resin's desired (targeted) AV and desired (targeted) OHV.

If desired, additives such anti-oxidants, flow additives, tribo additives can be added to the polyester resin P1 whilst the polyester resin P1 is in the reactor vessel and prior the polyester resin P1 is discharged as mentioned herein; this addition typically takes place at temperatures in the range of 170-195° C. If said additives are mixed within the polyester resin P1 a reasonable amount of time to ensure proper mixing of the additive into the polyester resin P1 is carried out; for example the mixing can last from 15 to 60 min at temperatures in the range of 170-195° C.; subsequently, the polyester resin P1 is ready for being discharged.

The branched carboxylic acid functional polyester (P1), has:

a. a $T_g$ of at least 40° C. as measured by Differential Scanning calorimetry (DSC) at a heating rate of 5° C./min; and
b. an acid value (AV) of at least 19 and of at most 35 mg KOH/g P1; and
c. a hydroxyl value of at most 7 mg KOH/g P1; and
d. a functionality of at least 2.1 and of at most 3; and said polyester resin P1 is the reaction product of at least the following monomers:
  neopentyl glycol in an amount of at least 31 and of at most 50 mol %; and
  ethylene glycol in an amount of at least 2.5 and of at most 20 mol %; and
  a $C_6$ diol in an amount of at least 1.1 and of at most 4.9 mol %; and
  isophthalic acid in an amount of at least 0 and of at most 6.5 mol %; and
  terephthalic acid in an amount of at least 39 and of at most 48 mol %; and
  adipic acid in an amount of at least 1 and of at most 10 mol %; and
  an at least trifunctional monomer in an amount of at least 0.001 and of at most 3 mol %; and
  wherein the mol % is based on the polyester resin P1 and wherein the total amount of monomers used for the preparation of the polyester resin P1 is 100 mol %.

The polyester resin P1 may be amorphous or crystalline; preferably the polyester resin P1 is amorphous. Typically an amorphous polyester resin is characterized by a high degree of transparency (clarity).

The polyester resin P1 has an $M_n$ of at least 1000 and of at most 15000 Da. Preferably, the polyester resin P1 has an $M_n$ of at least 1200, more preferably of at least 1300, even more preferably of at least 1500, most preferably of at least 1600, especially of at least 1800, more especially of at least 2000, even more especially of at least 2100, most especially of at least 2200, for example of at least 2500, for example of at least 2800 for example of at least 3000 for example of at least 3200 for example of at least 3500 for example of at least 3800 for example of at least 4000, for example of at least 4100 Da. Preferably, the polyester resin P1 has an $M_n$ of at most 12000, more preferably of at most 10000, even more preferably of at most 9000, most preferably of at most 8000, especially of at most 7500, more especially of at most 7000, even more especially of at most 6500, most especially of at most 6200, for example of at most 6000 Da.

The polyester resin P1 has a $T_g$ of at least 40° C. Preferably the polyester resin P1 has a $T_g$ of at least 45, more preferably of at least 48, more preferably of at least 50, even more preferably of at least 52° C. Preferably, the polyester resin P1 has a $T_g$ of at most 120, more preferably of at most 100, more preferably of at most 90, even more preferably of at most 85, most preferably of at most 80, especially of at most 78, more especially of at most 75, even more especially of at most 70, most especially of at most 68, for example of at most 65, for example of at most 62° C.

The polyester resin P1 has an acid value (AV) of at least 19 and of at most 35 mg KOH/g P1. Preferably, the polyester resin P1 has an acid value of at least 19.5, more preferably of at least 19.8, more preferably of at least 20, even more preferably of at least 21, most preferably of at least 22, especially of at least 23, more especially of at least 23.5 mg KOH/g P1. Preferably, the polyester resin P1 has an acid value of at most 33, more preferably of at most 32, more preferably of at most 30, even more preferably of at most 29, most preferably of at most 28.5, especially of at most 28, more especially of at most 27.5 mg KOH/g P1.

The polyester resin P1 has a hydroxyl value (OHV) of at most 7 mg KOH/g P1. Preferably, the polyester resin P1 has a hydroxyl value of at least 0, more preferably of at least 0.01, more preferably of at least 0.05, even more preferably of at least 0.1, most preferably of at least 0.2, especially of at least 0.5, more especially of at least 1 mg KOH/g P1. The polyester resin P1 has preferably a hydroxyl value of at most 6, more preferably of at most 5, most preferably of at most 4.9, especially of at most 4.5, more especially of at most 4.2, even more especially of at most 4 mg KOH/g P1.

The polyester resin P1 has a functionality of at least 2.1 and of at most 3. Preferably, the polyester resin P1 has a functionality of at least 2.15, more preferably of at least 2.2, more preferably of at least 2.25, even more preferably of at least 2.28. Preferably, the polyester resin P1 has a functionality of at most 2.95, more preferably of at most 2.9, more preferably of at most 2.8, even more preferably of at most 2.7, most preferably of at most 2.6, especially of at most 2.55, more especially of at most 2.5, even more especially of at most 2.48.

Preferably, the polyester resin P1 has a viscosity of at most 150, more preferably of at most 125, most preferably of at most 100, for example of at most 80, for example of at most 75, for example of at most 70, for example of at most 65, for example of at most 60, for example of at most 55, for example of at most 50 for example of at most 40 for example of at most 30, for example of at most 25, for example of at most 20, for example of at most 15, for example of at most 10 for example of at most 5 for example of at most 3 Pa·s. Preferably, the polyester resin P1 has a viscosity of at least 0.001, more preferably of at least 0.01, even more preferably of at least 0.1, most preferably of at least 1, especially of at least 3, more especially of at least 5, even more especially of at least 8, most especially of at least 12, for example of at least 15, for example of at least 20, for example of at least 25, for example of at least 30 Pa·s.

In case in which the polyester resin P1 is amorphous, said amorphous polyester resin P1 has preferably a viscosity of at most 150, more preferably of at most 125, most preferably of at most 100, for example of at most 80, for example of at most 75, for example of at most 70, for example of at most 65, for example of at most 60, for example of at most 55 Pa·s. Preferably, the amorphous polyester resin P1 has a viscosity of at least 5, more preferably of at least 8, even more preferably of at least 12, most preferably of at least 15, especially of at least 20, more especially of at least 25, most especially of at least 30 Pa·s.

In case in which the polyester resin P1 is crystalline, said resin has preferably a melting temperature ($T_m$) of at least 30, more preferably of at least 40, more preferably of at least 50, most preferably of at least 60° C. In case in which the polyester resin P1 is crystalline, said resin has preferably a melting temperature ($T_m$) of at most 200, more preferably at most 180, even more preferably at most 160° C.

In case in which the polyester resin P1 is crystalline, said resin has preferably a crystallization temperature ($T_c$) of at least 30, more preferably of at least 40° C. In case in which the polyester resin P1 is crystalline, said resin has preferably a crystallization temperature ($T_c$) of at most 200, more preferably of at most 180, even more preferably of at most 160, even more preferably of at most 140° C.

In case in which the polyester resin P1 is crystalline, said polyester resin has preferably a melting enthalpy ($\Delta H_m$) of at least 45, more preferably of at least 50, even more preferably of at least 55, most preferably of at least 60, especially of at least 65 J/g. In case in which the polyester resin P1 is crystalline, said polyester resin has preferably a melting enthalpy ($\Delta H_m$) of at most 400, more preferably of at most 300, most preferably of at most 260, especially of at most 240, more especially of at most 220, most especially of at most 200, for example of at most 180, for example of at most 160, for example of at most 140, for example of at most 130, for example at most 120 J/g.

In case in which the polyester resin P1 is crystalline, said crystalline polyester resin P1 has preferably a viscosity of at least 0.001, more preferably of at least 0.01, even more preferably of at least 0.1, Pa·s. Preferably, the crystalline polyester resin P1 has a viscosity of at most 100, more preferably of at most 50, even more preferably of at most 30, most preferably of at most 25, especially of at most 15, more especially of at most 10, most especially of at most 5, for example of at most 3 Pa·s. Preferably, the crystalline polyester resin P1 has a viscosity in the range of from 0.01 to 5 Pa·s.

Preferably, the polyester resin P1 is solid at 23° C. and at atmospheric pressure (=1 atm). Preferably the polyester resin P1 is substantially dry. Even more preferably the polyester resin P1 is substantially dry and solid at 23° C. and at atmospheric pressure.

The neopentyl glycol (2,2'-dimethyl-1,3-propanediol), used for the preparation of polyester resin P1 is in an amount of at least 25 and of at most 50 mol %. Preferably the neopentyl glycol used for the preparation of polyester resin P1 is in an amount of at least 25.5, more preferably in an amount of at least 26, even more preferably in an amount of at least 26.5, most preferably in an amount of at least 26.8, mol % based on the P1. Preferably, the neopentyl glycol used for the preparation of polyester resin P1 is in an amount of at most 48, more preferably in an amount of at most 46, even more preferably in an amount of at most 44, most preferably in an amount of at most 42, especially in an amount of at most 40, more especially in an amount of at most 39, most especially in an amount of at most 38, for example in an amount of at most 37, for example in an amount of at most 36.5 mol % based on the P1.

The ethylene glycol used for the preparation of polyester resin P1 is in an amount of at least 2.5 and of at most 20 mol %. Preferably the ethylene glycol used for the preparation of polyester resin P1 is in an amount of at least 3, more preferably in an amount of at least 4, even more preferably in an amount of at least 5, most preferably in an amount of at least 6, especially in an amount of at least 7, more especially in an amount of at least 8, most especially in an amount of at least 8.5, for example in an amount of at least 9, for example in an amount of at least 9.5, for example in an amount of at least 9.8, for example in an amount of at least 10 mol % based on the P1. Preferably, the ethylene glycol used for the preparation of polyester resin P1 is in an amount of at most 19.5, more preferably in an amount of at most 19, even more preferably in an amount of at most 18.8, most preferably in an amount of at most 18.6, especially in an amount of at most 18.4 mol % based on the P1.

The $C_6$ diol can be a linear, cyclic, saturated, unsaturated and combinations thereof. Preferably the $C_6$ diol is linear, more preferably the $C_6$ diol is linear and saturated. Examples of $C_6$ diol that may be used in the preparation of the polyester resin P1 include but are not limited to 1,6-hexanediol, 1,5-hexanediol, 1,4-hexanediol, 1,3-hexanediol, 1,2-hexanediol, 2,3-hexanediol, 2,4-hexanediol, 2,5-hexanediol, 3,4-hexanediol, 2-ethyl-1,4-butanediol, 2,3-dimethyl-1,4-butanediol, 2,3-dimethyl-2,3-butanediol, 2-hexene-1,6-diol, 3-hexene-1,6-diol, 2-hexene-1,5-diol, dipropylene glycol, 1,4-cyclohexanediol, 1,4-benzenediol. Preferably, the $C_6$ diol used for the preparation of polyester resin P1 is selected from the group consisting of 1,6-hexanediol, 1,5-hexanediol, 1,4-hexanediol, 2,5-hexanediol 1,3-hexanediol, 1,2-hexanediol, 2-ethyl-1,3-hexanediol and mixtures thereof, more preferably the $C_6$ diol used for the preparation of polyester resin P1 is selected from the group consisting of 1,6-hexanediol, 1,5-hexanediol, 1,4-hexanediol and 2,5-hexanediol and mixtures thereof, even more preferably the $C_6$ diol used for the preparation of polyester resin P1 is selected from the group consisting of 1,6-hexanediol, 1,5-hexanediol and mixtures thereof, most preferably the $C_6$ diol used for the preparation of polyester resin P1 is 1,6-hexanediol.

The $C_6$ diol used for the preparation of polyester resin P1 is in an amount of at least 1.1 and of at most 4.9 mol %. Preferably, the $C_6$ diol used for the preparation of polyester resin P1 is in an amount of at least 1.2, more preferably in an amount of at least 1.5, even more preferably in an amount of at least 1.8, most preferably in an amount of at least 2, especially in an amount of at least 2.2, more especially in an amount of at least 2.4, even more especially in an amount of at least 2.6, most especially in an amount of at least 2.7, for example in an amount of at least 2.8, for example in an amount of at least 2.85 mol % based on the P1. Preferably, the $C_6$ diol used for the preparation of polyester resin P1 is in an amount of at most 4.8, more preferably in an amount of at most 4.7, even more preferably in an amount of at most 4.6, most preferably in an amount of at most 4.5, especially in an amount of at most 4.4, more especially in an amount of at most 4.2, most especially in an amount of at most 4.1, for example in an amount of at most 4, for example in an amount of at most 3.9, for example in an amount of at most 3.8, for example in an amount of at most 3.7, for example in an amount of at most 3.6, for example in an amount of at most 3.5, for example in an amount of at most 3.4, for example in an amount of at most 3.3, for example in an amount of at most 3.2 mol % based on the P1.

The isophthalic acid used for the preparation of polyester resin P1 is in an amount of at least 0 and of at most 6.5 mol %. Preferably the isophthalic acid used for the preparation of polyester resin P1 is in an amount of at least 0.1, more preferably in an amount of at least 0.5, even more preferably in an amount of at least 0.8, most preferably in an amount of at least 1, especially in an amount of at least 1.5, more especially in an amount of at least 1.8, most especially in an amount of at least 2, for example in an amount of at least 2.2, for example in an amount of at least 2.5, for example in an amount of at most 2.8, for example in an amount of at least 3, for example in an amount of at least 3.2, for example in an amount of at least 3.5, for example in an amount of at least 3.8, for example in an amount of at least 4, for example in an amount of at least 4.2, for example in an amount of at least 4.4 mol % based on the P1. Preferably the isophthalic acid used for the preparation of polyester resin P1 is in an amount of at most 6.5, more preferably in an amount of at most 6.2, even more preferably in an amount of at most 6, most preferably in an amount of at most 5.8, especially in an amount of at most 5.5, more especially in an amount of at most 5.2, most especially in an amount of at most 5, for example in an amount of at most 4.8 mol % based on the P1.

The terephthalic acid used for the preparation of polyester resin P1 is in an amount of at least 39 and of at most 48 mol %. Preferably the terephthalic acid used for the preparation of polyester resin P1 is in an amount of at least 39.5, more preferably in an amount of at least 40, even more preferably in an amount of at least 40.5, most preferably in an amount of at least 41, especially in an amount of at least 42 mol % based on the P1. Preferably the terephthalic acid used for the preparation of polyester resin P1 is in an amount of at most 47, more preferably in an amount of at most 46, even more preferably in an amount of at most 45.5, most preferably in an amount of at most 45.2, especially in an amount of at most 44.8, more especially in an amount of at most 44.6, even more especially in an amount of at most 44.5 mol % based on the P1.

The adipic acid used for the preparation of polyester resin P1 is in an amount of at least 0.01 and of at most 10 mol %. Preferably the adipic acid used for the preparation of polyester resin P1 is in an amount of at least 0.5, more preferably in an amount of at least 1, even more preferably in an amount of at least 1.5, most preferably in an amount of at least 2, especially in an amount of at least 2.5, more especially in an amount of at least 2.8, even more especially in an amount of at least 3, most especially in an amount of at least 3.2, for example in an amount of at least 3.3, for example in an amount of at least 3.4 mol % based on the P1. Preferably, the adipic acid used for the preparation of polyester resin P1 is in an amount of at most 9, more preferably in an amount of at most 8, even more preferably in an amount of at most 7, most preferably in an amount of at most 6, especially in an amount of at most 5.5, more especially in an amount of at most 5, most especially in an amount of at most 4.5, for example in an amount of at most 4, for example of at most 3.9 mol % based on the P1.

Preferably, the at least trifunctional monomer used for the preparation of polyester resin P1 is in an amount of at least 0.01 and of at most 5 mol % based on the P1. Preferably the polycarboxylic acid used for the preparation of polyester resin P1 is in an amount of at least 0.02, more preferably in an amount of at least 0.03, even more preferably in an amount of at least 0.04, most preferably in an amount of at least 0.045, especially in an amount of at least 0.05 mol % based on the P1. Preferably, the at least trifunctional monomer used for the preparation of polyester resin P1 is in an amount of at most 5, more preferably in an amount of at most 4, even more preferably in an amount of at most 3.5, most preferably in an amount of at most 3.2, especially in an amount of at most 3, more especially in an amount of at most 2.9, even more especially in an amount of at most 2.8, most especially in an amount of at most 2.7, for example in an amount of at most 2.6, for example in an amount of at most 2.5, for example in an amount of at most 2.4 mol % based on the P1. Examples of an at least trifunctional monomer are trimethylolpropane, pentaerythritol, glycerol, dipentaerythritol, trimethylolethane. Preferably, the at least trifunctional monomer is selected from the group consisting of trimethylolethane, trimethylolpropane and glycerol. Preferably the at least trifunctional monomer is a triol, preferably the at least trifunctional monomer is trimethylolpropane.

Apart from neopentyl glycol and ethylene glycol, other diols that can be used for the preparation of the polyester resin P1 include but are not limited to: diethylene glycol, triethylene glycol, 1,2-propylene glycol, 1,3-propylene glycol, 1,3-butylethyl propanediol, 2-butyl-2-ethyl-1,3-propanediol (BEPD), 2-methyl-1,3-propanediol (MP diol), 1,2-butylene glycol, 1,3-butylene glycol, 1,4-butylene glycol, 1,3-isobutanediol, 1,2-isobutanediol, 2,3-butanediol, 2-butenediol(1,4), 2,2,4-trimethyl-1,3-pentanediol, 1,2-cyclopentanediol, 1,3-cyclopentanediol, 1,4-cyclopentanediol, 1,6-hexanediol, 1,4-dimethoxy cylcohexane, 1,2-cyclohexanediol, 1,3-cyclohexanediol, 1,4-cyclohexanediol, 1,4-cyclohexanedimethanol, 4,4'-methylene-bis(cyclohexanol), 4,4'-isopropylidene-bis(cyclohexanol), (hydrogenated bisphenol A) 1,4-bis(hydroxymethyl)cyclohexane, 1,3-bis(hydroxyethyl) cyclohexane, 1,3-bis(hydroxypropyl) cyclohexane, 1,3-bis(hydroxyisopropyl) cyclohexane, dodecanediol, xylene glycol, bisphenol A/propylene oxide adducts, hydroquinone/propylene oxide adducts, and hydroquinone/ethylene oxide adducts.

Apart from isophthalic acid, terephthalic acid and adipic acid other diacids can be used for the preparation of the polyester resin P1 include but are not limited to: 2,6-naphtalene dicarboxylic acid, 4,4'-oxybisbenzoic acid, tetrahydrophthalic anhydride, cyclohexanedicarboxylic acid, succinic acid, sebacid acid, phthalic anhydride, maleic anhydride, fumaric acid, itaconic acid.

Any feature, element, component, embodiment, range and especially any preferred feature, preferred element, preferred embodiment, preferred range, preferred combination of ranges, preferment described in section 6 can be combined with each other.

7. Thermosetting Powder Coating Composition A1 (PCC A1)

The PCC A1 is as described in the entire application and as defined by the claims.

The PCC A1 is a one component thermosetting powder coating composition.

The PCC A1 can be a heat-curable and/or radiation curable thermosetting powder coating composition; preferably the PCC A1 is a heat-curable thermosetting powder coating composition.

The PCC A1 can be amorphous or crystalline; preferably the PCC A1 is amorphous.

The thermosetting powder coating composition A1 (PCC A1) comprises a binder K1 in an amount of at least 10 and of at most 100 pph PCC A1, said binder K1 comprising a polyester resin P1 and a crosslinker X1.

Preferably the PCC A1 comprises a binder K1 in an amount of at least 15, more preferably of at least 20, even more preferably of at least 30, most preferably of at least 35, especially of at least 40, more especially of at least 45, even more especially of at least 50, most especially of at least 60, for example of at least 70, for example of at least 75, for example of at least 80, for example of at least 85, for example of at least 90, for example of at least 92, for example of at least 94, for example of at least 96, for example of at least 97, for example of at least 98, for example of at least 99 pph PCC A1. Preferably the PCC A1 comprises a binder K1 in an amount of at most 99, more preferably of at most 98, even more preferably of at most 97, most preferably of at most 96, especially of at most 94, more especially of at most 92, even more especially of at most 90, most especially of at most 85, for example of at most 80, for example of at most 75, for example of at most 70, for example of at most 60, for example of at most 50, for example of at most 45, for example of at most 40, for example of at most 35, for example of at most 30, for example of at most 20, for example of at most 15 pph PCC A1.

The binder K1 comprises a polyester resin P1 in an amount of at least 10 and at most 99 pph binder K1. Preferably, the binder K1 comprises a P1 in an amount of at least 15, more preferably in an amount of at least 20, even more preferably in an amount of at least 25, most preferably of at least 30, especially in an amount of at least 35, more especially in an amount of at least 40, even more especially in an amount of at least 45 most especially in an amount of at least 50 pph binder K1. Preferably, the binder K1 comprises a P1 in an amount of at most 98, more preferably in an amount of at most 97, even more preferably in an amount of at most 95, most preferably of at most 93, especially in an amount of at most 92, more especially in an amount of at most 90, even more especially in an amount of at most 85, most especially in an amount of at most 80, for example in an amount of at most 75, for example in an amount of at most 70, for example in an amount of at most 65, for example in an amount of at most 60, for example in an amount of at most 55, for example in an amount of at most 50 pph binder K1.

The binder K1 comprises a crosslinker X1 in an amount of at least 1 and at most 90 pph binder. Preferably, the binder K1 comprises a X1 in an amount of at least 2, more preferably in an amount of at least 3, even more preferably in an amount of at least 5, most preferably of at least 7, especially in an amount of at least 6, more especially in an amount of at least 8, even more especially in an amount of at least 9, most especially in an amount of at least 10, for example in an amount of at least 11, for example in an amount of at least 12, for example in an amount of at least 13, for example in an amount of at least 14, for example in an amount of at least 15, for example in an amount of at least 20, for example in an amount of at least 25, for example in an amount of at least 30, for example in an amount of at least 35, for example in an amount of at least 40, for example in an amount of at least 45, for example in an amount of at least 50 pph binder K1. Preferably, the binder K1 comprises a X1 in an amount of at most 85, more preferably in an amount of at most 80, even more preferably in an amount of at most 75, most preferably of at most 70, especially in an amount of at most 65, more especially in an amount of at most 60, even more especially in an amount of at most 55, most especially in an amount of at most 50, for example in an amount of at most 45, for example in an amount of at most 40, for example in an amount of at most 35, for example in an amount of at most 30, for example in an amount of at most 25, for example in an amount of at most 20, for example in an amount of at most 18, for example in an amount of at most 16, for example in an amount of at most 15, for example in an amount of at most 14, for example in an amount of at most 13, for example in an amount of at most 12 for example in an amount of at most 10, for example in an amount of at most 9, for example in an amount of at most 8, for example in an amount of at most 7 for example in an amount of at most 5 for example in an amount of at most 3, for example in an amount of at most 2 for example in an amount of at most 1 pph binder K1.

Preferably, the crosslinker X1 is selected from the group consisting of BHA compounds, epoxy compounds and mixtures thereof; more preferably the crosslinker X1 is selected from the group consisting of BHA compounds and epoxy compounds; even more preferably the crosslinker X1 is selected from the group consisting of BHA compounds or equally the crosslinker X1 is a BHA compound.

Preferably the BHA compound has at least 3 β-hydroxyalkylamide groups, even more preferably the BHA compound has at least 4 β-hydroxyalkylamide groups, most preferably the BHA compound has at least 2 and at most 4 β-hydroxyalkylamide groups, especially the BHA compound has at least 3 and at most 4 β-hydroxyalkylamide groups, more especially the BHA compound has 4 β-hydroxyalkylamide groups.

Some BHA compounds are disclosed in U.S. Pat. Nos. 4,727,111, 4,788,255, 4,076,917, EP 322834 and EP 473380.

Suitable examples of commercially available BHA compounds are for example N,N,N',N'-tetrakis-(2-hydroxyethyl)-adipamide (Primid® XL-552) and N,N,N',N'-tetrakis-(2-hydroxypropyl)-adipamide (Primid® QM 1260) available from EMS Chemie AG. Primid® XL-552 is an example of a BHA compound having 4 β-hydroxyalkylamide groups.

If the crosslinker X1 is a BHA compound, then the binder K1 comprises a BHA compound preferably in an amount of at least 1, more preferably in an amount of at least 2 pph binder K1. If the crosslinker X1 is a BHA compound, then the binder K1 comprises a BHA compound preferably in an amount of at most 25, more preferably in an amount of at most 20, even more preferably in an amount of at most 15, most preferably in an amount of at most 13, especially in an amount of at most 10, more especially in an amount of at most 9, even more especially in an amount of at most 8, most especially in an amount of at most 7 pph binder K1.

If the crosslinker X1 is a BHA compound, then the binder K1 comprises a polyester resin P1 preferably in an amount of at least 75, more preferably in an amount of at least 80, even more preferably in an amount of at least 85, most preferably in an amount of at least 87, especially in an amount of at least 90, more especially in an amount of at least 91, even more especially in an amount of at least 92 most especially in an amount of at least 93 pph binder K1. If the crosslinker X1 is a BHA compound, then the binder K1 comprises a polyester resin P1 preferably in an amount of at most 99, more preferably in an amount of at most 98 pph binder K1.

Suitable examples of epoxy compounds include bisphenol-A resins, bisphenol-F epoxy resins, glycidylesters, triglycidylisocyanurates and combinations thereof. It is preferred to use a an epoxy compound chosen from the group consisting of bisphenol-A resins, bisphenol-F epoxy resins, glycidylesters and combinations thereof. More preferably, the epoxy compound is chosen from the group consisting of bisphenol-A resins, glycidylesters and combinations thereof. Suitable examples of commercially available bisphenol-A epoxy resins include Araldite® GT-7004 (Huntsman), Epikote® 1002 (Shell) and DER 662®, DER 663® and DER 664® (Dow). Suitable examples of commercially available glycidylesters include Araldite® PT910 and Araldite® PT912. Examples of triglycidylisocyanurates include TGIC (triglycidylisocyanurate), which is commercially available as Araldite® PT810. Preferably, the epoxy compound is selected from the group consisting of bisphenol-A epoxy resins, triglycidylisocyanurates, and mixtures thereof; more preferably the epoxy compound is selected from the group consisting of bisphenol-A epoxy resins, and triglycidylisocyanurates, even more preferably the epoxy compound is a bisphenol-A epoxy resin.

The epoxy compounds can vary considerably in molecular weight. This is most often expressed as the epoxy equivalent weight (EEW). The epoxy equivalent weight is the weight of an epoxy compound containing exactly one mole of epoxy groups, expressed in g/mol. Preferably the EEW ranges from 100 to 1500, more preferably from 150 to 1200, even more preferably from 200 to 900 and most preferably from 400 to 850 g/mol.

If the crosslinker X1 is an epoxy compound, then the binder K1 comprises an epoxy compound preferably in an amount of at least 2, more preferably in an amount of at least 3, even more preferably in an amount of at least 4, most preferably in an amount of at least 5, especially in an amount of at least 6, more especially in an amount of at least 7, even more especially in an amount of at least 8, most especially in an amount of at least 9, for example in an amount of at least 10, for example in an amount of at least 11, for example in an amount of at least 12, for example in an amount of at least 13, for example in an amount of at least 14 pph binder K1. If the crosslinker X1 is an epoxy compound, then the binder K1 comprises an epoxy compound preferably in an amount of at most 70, more preferably in an amount of at most 65, even more preferably in an amount of at most 60, most preferably in an amount of at most 55, especially in an amount of at most 50, more especially in an amount of at most 45, most especially in an amount of at most 40, for example of at most 35, for example of at most 30, for example of at most 25, for example of at most 20 pph binder K1.

If the crosslinker X1 is an epoxy compound, then the binder K1 comprises a polyester resin P1 preferably in an amount of at least 40, more preferably in an amount of at least 45, even more preferably in an amount of at least 50, most preferably in an amount of at least 55, especially in an amount of at least 60 pph binder K1. If the crosslinker X1 is an epoxy compound, then the binder K1 comprises a polyester resin P1 preferably in an amount of at most 98, more preferably in an amount of at most 97, even more preferably in an amount of at most 96, most preferably in an amount of at most 95, especially in an amount of at most 94, more especially in an amount of at most 93, even more especially in an amount of at most 92, most especially in an amount of at most 91, for example in an amount of at most 90, for example in an amount of at most 89, for example in an amount of at most 88, for example in an amount of at most 87, for example in an amount of at most 86, for example in an amount of at most 80, for example in an amount of at most 75, for example in an amount of at most 70 pph binder K1.

If the crosslinker X1 is an epoxy compound, preferably the PCC A1 comprises a catalyst to promote the crosslinking reaction of the crosslinker X1 with the polyester P1. Suitable catalysts include amine containing compounds, such as tertiary amines, phosphines, imidazoles, quaternary ammonium salts, phosphonium salts, metal salts. Specific samples of these catalysts are tetrabutylammonium and choline chloride. These catalysts may be used either alone or in combination.

The glass transition temperature ($T_g$) of the PCC A1 is preferably at least 23 more preferably at least 25, even more preferably at least 35, most preferably at least 40, especially at least 45° C. The glass transition temperature ($T_g$) of the PCC A1 is preferably at most 100° C., more preferably at most 90° C., even more preferably at most 80° C., most preferably at the most 70° C.

In case in which the PCC A1 has a $T_m$, the $T_m$ is preferably at least 23, more preferably at least 25, even more preferably at least 30, most preferably at least 40, especially at least 45, most preferably at least 50° C. The $T_m$ of the PCC A1 is preferably at most 180° C., more preferably at most 160° C., even more preferably at most 150, most preferably at most 140° C.

As is apparent to the skilled person, besides a polyester resin P1, also other resins different than polyester resins P1, for example other carboxylic acid functional polyester resins different than polyester resin P1, may be present in the binder K1; said resins different than polyester resins P1 can be amorphous or crystalline, preferably said resins are amorphous. Preferably, the amount of a polyester resin P1 in the binder K1 is at least 90, preferably at least 93, more preferably at least 95, even more preferably at least 97, most preferably at least 98, especially at least 99 and more especially 100% w/w based on total amount of resins present in the binder K1. Preferably, the binder K1 comprises —apart from a crosslinker X1-, only a polyester resin P1, as a carboxylic acid functional resin, because this offers simplicity in formulating.

It is advantageous to use only a polyester resin P1 in the PCC A1 as the use of only one resin as opposed to a mixture of resins in the PCC A1 is less laborious and economically more attractive.

The PCC A1 may further comprise waxes, pigments, fillers and/or the usual (processing) additives, for example degassing agents, smoothness, appearance enhancing agents or (light) stabilizers. The pigments may be inorganic or organic. Suitable inorganic pigments include for example, titanium dioxide, zinc sulphide, zinc phosphate, mica, iron oxide and/or chromium oxide. Suitable organic pigments include for example azo compounds. Suitable fillers include for example metal oxides, silicates, carbonates and sulphates. Suitable stabilizers include for example primary and/or secondary antioxidants and UV stabilizers for example quinones, (sterically hindered) phenolic compounds, phosphonites, phosphites, thioethers and HALS (hindered amine light stabilizers). Examples of suitable degassing agents include cyclohexane dimethanol bisbenzoate, benzoin and benzoin derivatives such as for example those described in WO02/50194. Other additives, such as additives for improving tribo-chargeability may also be added. Some of these additives may be added after the polyester resin P1 is prepared in a chemical reactor but before the polyester resin P1 is discharged from the chemical reactor. Alternatively, some of these additives may be added in the premix of the thermosetting powder coating composition as described above or in the extruder for instance by liquid injection.

Any feature, element, component, embodiment, range and especially any preferred feature, preferred element, preferred embodiment, preferred range, preferred combination of ranges, preferment described in section 7 can be combined with each other.

8. Process for Making the PCC A1

The PCC A1 may be prepared by mixing the separately weighed-out components in a mixer, heat the obtained premix, for example in a kneader, preferably in an extruder to obtain an extrudate, cool down the obtained extrudate until it solidifies and grind it into granules or flakes that are further ground to reduce the particle size followed by appropriate classification to obtain a thermosetting powder coating composition of the right particle size.

Alternatively, the PCC A may be prepared by mixing the separately weighed-out crosslinker X1 with polyester resin P1 to form a premix, heat the obtained premix, for example in a kneader, preferably in an extruder to obtain an extrudate, cool down the obtained extrudate until it solidifies and grind it into granules or flakes that are further ground to reduce the particle size. Subsequently, mixing the rest of the separately weighed-out components and the extrudate of the crosslinker X1 with the polyester resin P1 to form another premix, heat the thus obtained premix, for example in a kneader, preferably in an extruder to obtain an extrudate, cool down the obtained extrudate until it solidifies and grind it into granules or flakes that are further ground to reduce the particle size followed by appropriate classification to obtain a thermosetting powder coating composition of the right particle size.

Preferably, the PCC A1 is prepared by a process comprising the steps of:
a. mixing the components of the PCC A1 to obtain a premix;
b. heating the premix, preferably in an extruder, to obtain an extrudate;
c. cooling down the extrudate to obtain a solidified extrudate; and
d. grinding the solidified extrudate into smaller particles to obtain the PCC A1.

If the premix is heated in an extruder or mixer/kneader, it is preferred to use a temperature control in order to avoid too high temperatures that could lead to curing of the PCC A1 in the extruder. The temperature should be set so that a good mixing is ensured by melting/kneading/mixing of all components to get a homogeneous mass.

Preferably, the PCC A1 is prepared by a process comprising the steps of:
a. mixing the crosslinker X1 with the polyester resin P1 to obtain a premix 1;
b. heating the premix 1, preferably in an extruder, to obtain an extrudate of the crosslinker X1 with the polyester resin P1, namely extrudate 1;
c. cooling down the extrudate 1 to obtain a solidified extrudate 1; and
d. grinding the solidified extrudate 1 into smaller particles to obtain a mixture of the crosslinker X1 with the polyester resin P1, namely mixture 1; and
e. mixing the rest of the components of the PCC A1 with the mixture 1, to obtain a premix 2;
f. heating the premix 2, preferably in an extruder, to obtain an extrudate 2;
g. cooling down the extrudate 2 to obtain a solidified extrudate 2; and
h. grinding the solidified extrudate 2 into smaller particles to obtain the PCC A1.

If the premix 1 and/or 2 is/are heated in an extruder or mixer/kneader, it is preferred to use a temperature control in order to avoid too high temperatures that could lead to curing of the PCC A1 in the extruder. The temperature should be set so that a good mixing is ensured by melting/kneading/mixing of all components to get a homogeneous mass.

The PCC A1 may be applied to an article using the techniques known to the person skilled in the art, for example using electrostatic spray or electrostatic fluidized bed or flame spray.

The PCC A1 may be partially or fully cured via heating and/or radiation. Preferably the PCC A1 is partially or fully cured via heating.

In case of heating the PCC A1 in order to cure it, the heating of the PCC A1 can be carried out at a temperature and for a time suitable to cure the PCC A1.

Heating of the PCC A1 may be done using conventional methods, such as with a convection oven and/or with an (N)IR lamp and/or infrared laser and/or microwave equipment may be used to heat the PCC A1.

The temperature, at which the PCC A1 is cured, is preferably in the range of 120 to 225° C., more preferably from 130 to 200° C., even more preferably from 130 to 190° C., most preferably from 130 to 180° C., especially from 130 to 170° C., more especially from 130 to 160° C. Preferably, the temperature at which the PCC A1 is cured is preferably at most 225, more preferably at most 200, even more preferably at most 190, most preferably at most 180, most preferably at most 170, especially at most 160, more especially at most 150° C. Preferably, the temperature at which the thermosetting powder coating compositions of the invention are cured, is preferably at least 120, more preferably at least 130, even more preferably at least 135, most preferably at least 140, most preferably at least 145, especially at least 150, more especially at least 155° C.

Preferably the curing time of the PCC A1 is at most 60, more preferably is at most 45, even more preferably is at most 30, most preferably is at most 20, especially is at most 15, more especially is at most 12, even more especially is at most 10, most especially is at most 5 minutes.

Preferably the PCC A1 is cured at a temperature in the range of 130-170° C. for a time in the range of 5-30 minutes.

Any feature, element, component, embodiment, range and especially any preferred feature, preferred element, preferred embodiment, preferred range, preferred combination of ranges, preferment described in section 8 can be combined with each other.

9. Thermosetting Powder Coating Composition B (PCC B)

The PCC B is as described in the entire application and as defined by the claims.

The PCC B can be a heat-curable and/or radiation curable thermosetting powder coating composition; preferably the PCC B is a heat-curable thermosetting powder coating composition.

The PCC B is a two component thermosetting powder coating composition.

The PCC B can be amorphous or crystalline; preferably the PCC B is amorphous.

The PCC B comprises a physical mixture of two different, separate and distinct thermosetting powder coating compositions A (PCC A) and A1 (PCC A1), wherein,
PCC A is as described in the entire application and as claimed herein; and
PCC A1 is as described in the entire application and as claimed herein.

Preferably the PCC B comprises a physical mixture of two different, separate and distinct thermosetting powder coating compositions A (PCC A) and A1 (PCC A1), wherein,
PCC A is as described in the entire application and as claimed herein; and
PCC A1 is as described in the entire application and as claimed herein.
and wherein the crosslinkers X and X1 are each selected from the group consisting of BHA compounds, epoxy compounds and mixtures thereof.

Preferably the PCC B comprises a physical mixture of two different, separate and distinct thermosetting powder coating compositions A (PCC A) and A1 (PCC A1), wherein,
PCC A is as described in the entire application and as claimed herein; and
PCC A1 is as described in the entire application and as claimed herein.
and wherein the crosslinkers X and X1 are each a BHA compound.

Preferably the PCC B comprises a physical mixture of two different, separate and distinct thermosetting powder coating compositions A (PCC A) and A1 (PCC A1), wherein,
PCC A is as described in the entire application and as claimed herein; and
PCC A1 is as described in the entire application and as claimed herein.
and wherein the crosslinkers X and X1 are each the same BHA compound.

Preferably the PCC B comprises a physical mixture of two different, separate and distinct thermosetting powder coating compositions A (PCC A) and A1 (PCC A1), wherein,
PCC A is as described in the entire application and as claimed herein; and
PCC A1 is as described in the entire application and as claimed herein.
and wherein the crosslinkers X and X1 are each an epoxy compound.

Preferably the PCC B comprises a physical mixture of two different, separate and distinct thermosetting powder coating compositions A (PCC A) and A1 (PCC A1), wherein,
PCC A is as described in the entire application and as claimed herein; and PCC A1 is as described in the entire application and as claimed herein.
and wherein the crosslinkers X and X1 are each the same epoxy compound.

Preferably, the PCC B comprises a physical mixture of two different, separate and distinct thermosetting powder coating compositions A (PCC A) and A1 (PCC A1), wherein the weight ratio R=weight PCC A/weight PCC A1, is at least 0.2 and at most 8 and the total weight of the mixture of PCC A and PCC A1 in PCC B, is at least 10% w/w based on the total weight of PCC B, and wherein,
PCC A is as described in the entire application and as claimed herein; and
PCC A1 is as described in the entire application and as claimed herein.

More particularly, the thermosetting powder coating composition B (PCC B), comprises a physical mixture of two different, separate and distinct thermosetting powder coating compositions A (PCC A) and A1 (PCC A1), wherein PCC A is as described herein and as defined by the claims and wherein the total amount of PCC A and PCC A1 in PCC B, is at least 10 pph PCC B, and wherein the weight ratio R=weight PCC A/weight PCC A1, is at least 0.2 and at most 8,
and wherein
PCC A1 comprises a binder K1, said binder K1 comprising
a crosslinker X1 in an amount of at least 1 and of at most 90 pph binder K1; and
a branched carboxylic acid functional polyester resin P1 in an amount of at least 10 and of at most 99 pph binder K1, said polyester resin P1 having:
a. a $T_g$ of at least 40° C. as measured by Differential Scanning calorimetry (DSC) at a heating rate of 5° C./min; and
b. an acid value (AV) of at least 19 and of at most 35 mg KOH/g P1; and
c. a hydroxyl value of at most 7 mg KOH/g P1; and
d. a functionality of at least 2.1 and of at most 3; and
said polyester resin P1 being the reaction product of at least:
i) neopentyl glycol in an amount of at least 25 and of at most 50 mol %; and
ii) ethylene glycol in an amount of at least 2.5 and of at most 20 mol %; and
iii) a $C_6$ diol in an amount of at least 1.1 and of at most 4.9 mol %; and
iv) isophthalic acid in an amount of at least 0 and of a most 6.5 mol %; and
v) terephthalic acid in an amount of at least 39 and of at most 48 mol %; and
vi) adipic acid in an amount of at least 1 and of at most 10 mol %; and
vii) an at least trifunctional monomer in an amount of at least 0.001 and of at most 3 mol %; and
wherein the mol % is based on the polyester resin P1, and wherein the total amount of monomers used for the preparation of the polyester resin P1 is 100 mol %.

Preferably R is at least 0.2, more especially at least 0.3, most especially at least 0.4, for example at least 0.5, for example at least 0.6, for example at least 0.7, for example at least 0.8, for example at least 0.9, for example at least 0.95, for example at least 0.98, for example at least 0.99. Preferably R is at most 8, more preferably at most 7.5, even more preferably at most 7, most preferably at most 6.5, especially at most 6, more especially at most 5.5, most especially at most 5, for example at most 4.5, for example at most 4, for example at most 3.5, for example at most 3, for example at most 2.5, for example at most 2, for example at most 1.5, for example at most 1.4, for example at most 1.3, for example at most 1.2, for example at most 1.1, for example at most 1.05, for example at most 1.02, for example at most 1.01.

Preferably, R is at least 0.2 and at most 8.
Preferably, R is at least 0.3 and at most 3.
Preferably, R is at least 0.4 and at most 2.5.
Preferably, R is at least 0.5 and at most 2.
Preferably, R is at least 0.6 and at most 1.5.
Preferably, R is at least 0.8 and at most 1.3.
Preferably, R is equal to 1 (allowing for rounding errors).

PCC B may further comprise thermosetting powder coating compositions other than PCC A and PCC A1; preferably PCC B essentially consists of PCC A and PCC A1; most preferably PCC B consists of PCC A and PCC A1.

The total amount of PCC A and PCC A1 in the PCC B is at least 10, preferably at least 15, more preferably at least 20, even more preferably at least 25, most preferably at least 30, especially at least 35, more especially at least 40, most especially at least 45, for example at least 50, for example at least 55, for example at least 60, for example at least 65, for example at least 70, for example at least 75, for example at least 80, for example at least 85, for example at least 90, for example at least 95, for example at least 97, for example at least 98, for example at least 99, for example at least 99.5, for example at least 99.9, for example 100 pph PCC B.

The glass transition temperature ($T_g$) of the PCC B is preferably at least 23, more preferably at least 25, even more preferably at least 35, most preferably at least 40, especially at least 45° C. The glass transition temperature ($T_g$) of the PCC B is preferably at most 100, more preferably at most 90, even more preferably at most 80, most preferably at most 75, especially at most 70° C.

In case in which the PCC B has a $T_m$, the $T_m$ is preferably at least 23, more preferably at least 25, even more preferably at least 30, most preferably at least 35, especially at least 40° C. The $T_m$ of the PCC B is preferably at most 180, more preferably at most 160, even more preferably at most 150, most preferably at most 140° C.

Any feature, element, component, embodiment, range and especially any preferred feature, preferred element, preferred embodiment, preferred range, preferred combination of ranges, preferment described in section 9 can be combined with each other.

10. Process for Making the PCC B

Broadly in accordance with the invention there is provided a process for making the PCC B comprising the steps of:
a. providing a thermosetting powder coating composition A (PPC A) as disclosed herein and a different, separate, distinct thermosetting powder coating composition A1 (PPC A1) as disclosed herein; and
b. physically mixing PCC A with PCC A1, to obtain the PCC B.

Preferably, the process for making the PCC B comprises the steps of:
a. providing a thermosetting powder coating composition A (PPC A) as disclosed herein and a different, separate, distinct thermosetting powder coating composition A1 (PPC A1) as disclosed herein; and
b. physically mixing PCC A with PCC A1 in a weight ratio R=weight PCC A/weight PCC A1, that is at least 0.2 and at most 8, to obtain the PCC B.

Each of PCC A and PCC A1 are prepared separately from each other and each of them may be prepared as disclosed herein.

Once separately prepared, PCC A and PCC A1 are physically mixed together in a weight ratio R that is at least 0.2, more especially at least 0.3, most especially at least 0.4, for example at least 0.5, for example at least 0.6, for example at least 0.7, for example at least 0.8, for example at least 0.9, for example at least 0.95, for example at least 0.98, for example at least 0.99. Preferably R is at most 8, more preferably at most 7.5, even more preferably at most 7, most preferably at most 6.5, especially at most 6, more especially at most 5.5, most especially at most 5, for example at most 4.5, for example at most 4, for example at most 3.5, for example at most 3, for example at most 2.5, for example at most 2, for example at most 1.5, for example at most 1.4, for example at most 1.3, for example at most 1.2, for example at most 1.1, for example at most 1.05, for example at most 1.02, for example at most 1.01.

Preferably, R is at least 0.2 and at most 8.
Preferably, R is at least 0.3 and at most 3.
Preferably, R is at least 0.4 and at most 2.5.
Preferably, R is at least 0.5 and at most 2.
Preferably, R is at least 0.6 and at most 1.5.
Preferably, R is at least 0.8 and at most 1.3.
Preferably, R is equal to 1 (allowing for rounding errors).

Any feature, element, component, embodiment, range and especially any preferred feature, preferred element, preferred embodiment, preferred range, preferred combination of ranges, preferment described in section 10 can be combined with each other.

11. Cured Thermosetting Powder Coating Composition B and Process for Curing the PCC B and Object Obtainable by and/or Obtained by Said Process Broadly in accordance with the invention there is provided a cured thermosetting powder coating composition B, as the thermosetting powder coating composition B is described herein. The cured thermosetting powder coating composition B, is derived upon curing of the thermosetting powder coating composition B, as the thermosetting powder coating composition B is described herein. Preferably the cured thermosetting powder coating composition B is a powder coating, said powder coating can be a primer, top coat or an intermediate coating.

Broadly in accordance with the invention there is provided a process for curing the PCC B comprising the steps of:
i) providing the PCC B; and
ii) heating and/or radiating the PCC B to partially or fully cure it.

Preferably step ii) above is carried out via heating.

Broadly in accordance with the invention there is provided a object obtainable and/or obtained by the aforementioned process for curing the PCC B; said object is the cured thermosetting powder coating composition B and said cured thermosetting powder coating composition B is preferably a powder coating, said powder coating can be a primer, top coat or an intermediate coating.

In case of heating the PCC B in order to cure it, the heating of the PCC B can be carried out at a temperature and for a time suitable to cure the PCC B.

Heating of the PCC B may be done using conventional methods, such as with a convection oven and/or with an (N)IR lamp and/or infrared laser and/or microwave equipment may be used to heat the PCC B.

The temperature, at which the PCC B is cured, is preferably in the range of 120 to 225° C., more preferably from 130 to 200° C., even more preferably from 130 to 190° C., most preferably from 130 to 180° C., especially from 130 to 170° C., more especially from 130 to 160° C. Preferably, the temperature at which the PCC B is cured is preferably at most 225, more preferably at most 200, even more preferably at most 190, most preferably at most 180, most preferably at most 170, especially at most 160, more especially at most 150° C. Preferably, the temperature at which the thermosetting powder coating compositions of the invention are cured, is preferably at least 120, more preferably at least 130, even more preferably at least 135, most preferably at least 140, most preferably at least 145, especially at least 150, more especially at least 155° C.

Preferably the curing time of the PCC B is at most 60, more preferably is at most 45, even more preferably is at most 30, most preferably is at most 20, especially is at most 15, more especially is at most 12, even more especially is at most 10, most especially is at most 5 minutes.

Preferably the PCC B is cured at a temperature in the range of 130-170° C. for a time in the range of 5-30 minutes.

Any feature, element, component, embodiment, range and especially any preferred feature, preferred element, preferred embodiment, preferred range, preferred combination of ranges, preferment described in section 11 can be combined with each other.

12. Process for Coating an Article with the PCC B and Process for Coating and Curing an Article Having the PCC B Coated and Cured Thereon The PCC B may be applied onto an article using the techniques known to the person skilled in the art, for example using electrostatic spray or electrostatic fluidized bed or flame spray.

The invention relates also to a process for making an article having coated thereon the thermosetting powder coating composition B, comprising the step of applying the thermosetting powder coating composition B to an article to obtain the article having coated thereon the thermosetting powder coating composition B.

The invention further relates to a process for making an article having coated and cured thereon the thermosetting powder coating composition B, comprising the steps of:

a. applying the thermosetting powder coating composition B to an article;
b. heating and/or radiating the thermosetting powder coating composition B for enough time (curing time) and at a suitable temperature (curing temperature) to partially or fully cure the thermosetting powder coating composition B to obtain the article having coated and cured thereon a thermosetting powder coating composition B.

Preferably step b. above is carried out via heating.

Heating of the coated substrate may be done using conventional methods, such as with a convection oven and/or with an (N)IR lamp. Even microwave equipment may be used to heat the substrate.

The thermosetting powder coating compositions B are not only low bake, but may also be used for fast cure. It is known that thermosetting powder coating compositions that can be cured at lower temperatures offer at the same time the possibility for cure at relatively higher temperatures but for significant shorter times, thus allowing the end-user (powder coaters) to select the optimum cure conditions at will, hence maximizing the process efficiency and the powder coating line's throughput.

Any feature, element, component, embodiment, range and especially any preferred feature, preferred element, preferred embodiment, preferred range, preferred combination of ranges, preferment described in section 12 can be combined with each other.

13. Other Aspects and Embodiments of the Invention

The invention further relates to a use of:
i) a branched carboxylic acid functional polyester resin P as described herein and as defined by the claims; and/or
ii) a thermosetting powder coating composition A as described herein and as defined by the claims; and/or
iii) a thermosetting powder coating composition B as described herein and as defined by the claims; and/or
iv) a cured thermosetting powder coating composition A as described herein and as defined by the claims; and/or
v) a cured thermosetting powder coating composition B as described herein and as defined by the claims; and/or
vi) an article as described herein and as defined by the claims;

in powder coatings, powder-in-mould coatings, 3D-printing, automotive applications (car parts, agricultural machines, composite structures, ceramic structures, etc.), marine applications (ships, boats), aerospace applications (planes, helicopters, composite structures, ceramic structures, etc.), medical applications (artificial joints, meshes, woven or non-woven sheets, tapes, ribbons, bands, cables, tube-like products for e.g. ligament replacement, composite structures, ceramic structures, etc.), defense applications (ballistic protection, body armour, ballistic vests, ballistic helmets, ballistic vehicle protection, composite structures, ceramic structures, etc.), sports/recreational applications (fencing, skates, skateboarding, snowboarding, suspension lines on sport parachutes, paragliders, kites, kite lines for kite sports, climbing equipment, composite structures, ceramic structures, etc.), architectural applications (windows, doors, (pseudo-)walls, cables, etc.), bottling applications, household applications (household appliances, white goods, furniture, computer housings, etc.), machinery applications (can and bottle handling machine parts, moving parts on weaving machines, bearings, gears, composite structures, ceramic structures, computer housings, etc.), can applications, coil applications, energy applications for e.g. generators for wind, tide or solar energy, textile applications for e.g. fabrics, this can be very broad from impregnation technical textiles to for example complete composites both as coating and as a binder for composites, and electrical applications (cabinets for electrical wire or switch boards).

In another aspect the invention relates to a use of a branched carboxylic acid functional polyester resin P as described herein and as defined by the claims for matt powder coatings.

In another aspect the invention relates to a use of a thermosetting powder coating composition B as described herein and as defined by the claims for matt powder coatings.

In another aspect the invention relates to a method for obtaining matt powder coatings using a branched carboxylic acid functional polyester resin P as described herein and as defined by the claims.

In another aspect the invention relates to a method for obtaining matt powder coatings using a thermosetting powder coating composition B as described herein and as defined by the claims for matt powder coatings.

In another aspect the invention relates to a use of a thermosetting powder coating composition A as described herein and as defined by the claims in 2K thermosetting powder coating compositions.

In another aspect the invention relates to a method for obtaining a 2K thermosetting powder coating composition comprising a thermosetting powder coating composition A as described herein and as defined by the claims.

Yet, another aspect of the invention is a polyester resin P according to Example 1.

Yet, another aspect of the invention is a binder K as described in Examples 17 and 54.

Yet, another aspect of the invention is a thermosetting powder coating composition A according to Examples 17 and 54.

Yet, another aspect of the invention is thermosetting powder coating compositions B according to Examples 33-36, 48-51 and 56-57.

Yet, another aspect of the invention is powder coatings derived upon curing of the thermosetting powder coating compositions B of Examples 33-36, 48-51 and 56-57.

Many other variations and embodiments of the invention will be apparent to those skilled in the art and such variations are contemplated within the scope of the claims.

Any feature, element, component, embodiment, range and especially any preferred feature, preferred element, preferred embodiment, preferred range, preferred combination of ranges, preferment described in the entire application can be combined with each other.

Further aspects of the invention and preferred features thereof are given in the claims herein.

The invention will now be described in detail with reference to the following non limiting examples which are by way of illustration only.

14. Examples

The invention is explained in more detail with reference to the following non-limiting examples.

In the Examples section:
the abbreviation P represents a polyester resin according to the polyester resin P as disclosed herein and as defined by the claims;
the abbreviation P1 represents a polyester resin according to the polyester resin P1 as disclosed herein and as defined by the claims;

the abbreviation PCC A represents a thermosetting powder coating composition according to the thermosetting powder coating composition PCC A as disclosed herein and as defined by the claims;

the abbreviation PCC A1 represents a thermosetting powder coating composition according to the thermosetting powder coating composition PCC A1 as disclosed herein and as defined by the claims;

the abbreviation PCC B represents a thermosetting powder coating composition according to the thermosetting powder coating composition PCC B as disclosed herein and as defined by the claims.

In the Examples section:

the abbreviation CompP represents a polyester resin that is not according to the polyester resin P as the latter is disclosed herein and as is defined by the claims;

the abbreviation CompP1 represents a polyester resin that is not according to the polyester resin P1 as the latter is disclosed herein and as is defined by the claims;

the abbreviation CompPCC A represents a thermosetting powder coating composition that is not according to the thermosetting powder coating composition PCC A as the latter is disclosed herein and as defined by the claims;

the abbreviation CompPCC A1 represents a thermosetting powder coating composition that is not according to the thermosetting powder coating composition PCC A1 as the latter is disclosed herein and as is defined by the claims;

the abbreviation CompPCC B represents a thermosetting powder coating composition that is not according to the thermosetting powder coating composition PCC B as the latter is disclosed herein and as is defined by the claims.

In the Examples the abbreviation "n.m." denotes "not measured".

In the numbers shown in the Tables, the decimal sign is denoted by a comma ","; for any other number shown in the application, the decimal sign is denoted by a point ".".

14.1 Analytical Methods and Techniques for the Measurement of the Properties of the Polyester Resins Unless otherwise stated the theoretical number average molecular weight ($M_n$) is defined as follows:

$$M_n = (\Sigma_i N_i M_i)/(\Sigma_i N_i)$$

where $N_i$ is the number of molecules of molecular weight $M_i$.

In the case of the polyester resins shown in the Examples 1-16, the $M_n$ was calculated by multiplying the functionality (f)—as defined herein—with 56110 and dividing the outcome thereof by the sum of the desired (targeted) acid value (AV) (mg KOH/g polyester resin) and the desired (targeted) hydroxyl value (OHV) (mg KOH/g polyester resin) according to the equation EQ1.

The "functionality (f)" of the polyester resins shown in the Examples 1-16, was calculated according to equation EQ2.

Melt viscosity (herein mentioned as viscosity, in Pa.$) measurements were carried out at 160° C. on a Brookfield CAP 2000+H Viscometer. The applied shear-rate was 21 s$^{-1}$ and a 19.05 mm spindle (cone spindle CAP-S-05 (19.05 mm, 1.8°) was used.

The acid and hydroxyl values of the polyester resins P, were determined titrimetrically according to ISO 2114-2000 and ISO 4629-1978, respectively; in addition the targeted (theoretical) acid and hydroxyl values of said resins were also reported herein.

The hydroxyl value of the polyester resins P-1, P1-1, P1-2, P1-3 and P1-4 prepared and shown in the Examples section was lower than 5 mg KOH/g polyester resin.

All the polyesters prepared and shown in the Examples section were amorphous.

14.2 DSC Method for the Measurement of Glass Transition Temperature, Crystallization Temperature, Crystallization Enthalpy, Melting Temperature and Melting Enthalpy for Polyester Resins and/or Thermosetting Powder Coating Compositions (Mentioned as "DSC Method")

The glass transition temperature, crystallization temperature, crystallization enthalpy, melting temperature and melting enthalpy of a polyester resin, was/is measured via Differential Scanning calorimetry (DSC) according to the methodology described in this section, on a TA instruments DSC Q20 apparatus, in $N_2$ atmosphere calibrated with indium, within 24 hours from the time of preparation of the polyester resin. The processing of the signal (DSC thermogram, Heat Flow vs. Temperature) was or is to be carried out using Universal Analysis 2000 software version 4.5a provided by TA instruments, as described herein after. The part of the DSC Method referring to the polyester resins is mentioned herein as DSC Method-PR.

The glass transition temperature, crystallization temperature, crystallization enthalpy, melting temperature and melting enthalpy of a thermosetting powder coating composition was/is measured via Differential Scanning calorimetry (DSC) according to the methodology described in this section, on a TA instruments DSC Q20 apparatus, in $N_2$ atmosphere calibrated with indium, within 24 hours from the time of preparation of the polyester resin. The processing of the signal (DSC thermogram, Heat Flow vs. Temperature) was or is to be carried out using Universal Analysis 2000 software version 4.5a provided by TA instruments, as described herein after. The part of the DSC Method referring to the thermosetting powder coating compositions is mentioned herein as DSC Method-TPCC.

Each one of the glass transition temperature of the polyester resin (see DSC Method-PR) and the glass transition temperature of the thermosetting powder coating composition (DSC Method-TPCC) was/is the inflection point temperature of the temperature range over which the glass transition took place, said inflection point temperature was the point on the thermal curve corresponding to the peak of the first derivative (with respect to time) of the parent thermal curve. This point corresponds to the inflection point of the parent thermal curve, as defined in § 3.2.1.3 in ASTM E 1356-08.

The $T_m$ (in DSC Method-PR and DSC Method-TPCC) is measured as the temperature recorded at the minimum heat flow of the endothermic signal attributed to the melting of the sample.

The $\Delta H_m$ (in DSC Method-PR and DSC Method-TPCC) is measured as the integrated heat flow over the temperature range of the melting.

The $T_c$ (in DSC Method-PR and DSC Method-TPCC) is measured as the temperature recorded at the maximum heat flow of the exothermic signal attributed to the crystallization of the sample.

The ΔH$_c$ (in DSC Method-PR and DSC Method-TPCC) is measured as the integrated heat flow over the temperature range of the crystallization.

14.2.1 Polyester Resins ("DSC Method-PR")

The glass transition temperature (T$_g$ in ° C.) of the polyester resins was measured as follows: a sample of 10±5 mg of the polyester resin was weight and placed in the DSC cell. The sample was heated up to 150° C. at a heating rate of 40° C./minute (thermograph A). Once the sample has reached 150° C., the temperature was maintained at 150° C. for 10 minutes. Subsequently, the sample was cooled down to 0° C. at a heating rate of 30° C. (thermograph B); once the sample has reached 0° C., the temperature was maintained at 0° C. for 1 minute. Subsequently, the sample was heated up to 100° C. at a heating rate of 5° C./minute (thermograph C). Thermographs A, B and C were processed as the Y axis of the thermographs representing the heat flow having exotherm up and endotherm down. Thermograph C was used to measure the glass transition temperature (T$_g$) of the polyester resins.

The ΔH$_m$, T$_m$, ΔH$_c$ and T$_c$ of a polyester resin are measured as follows: a sample of 10±5 mg of the crystalline polyester resin is weight and placed in the DSC cell. The sample is equilibrated at 25° C. for 1 minute. Subsequently the sample is heated up to 200° C. at a heating rate of 5° C./minute. Once the sample has reached 200° C., the temperature was maintained at 200° C. for 1 minute (thermograph A). Subsequently, the sample is cooled down to −50° C. at a cooling rate of 5° C./minute (thermograph B); once the sample is reached −50° C., the temperature is maintained at −50° C. for 1 minute. Subsequently, the sample is heated up to 200 QC at a heating rate of 5° C./minute (thermograph C). Thermographs A, B and C were processed as the Y axis of the thermographs representing the heat flow has exotherm up and endotherm down. Thermograph B is used for measuring the ΔH$_c$ and T$_c$; thermograph C is used to measure the ΔH$_m$ and T$_m$.

14.2.2 Thermosetting Powder Coating Compositions ("DSC Method-TPCC")

The glass transition temperature of the thermosetting powder coating compositions (T$_g$ in ° C.) is measured 24 h after extrusion as follows: a sample of 10±5 mg of the thermosetting powder coating composition was weight and placed in the DSC cell. The sample was cooled down to −20° C. and the temperature was kept at −20° C. for 1 minute. Subsequently the sample was heated up to 200° C. at a heating rate of 5° C./minute (thermograph A). Thermograph A was used for measuring the T$_{g\ PCC}$.

The ΔH$_m$, T$_m$, ΔH$_c$ and T$_c$ of a thermosetting powder coating composition are measured as follows: a sample of 10±5 mg of the thermosetting powder coating composition is weight and placed in the DSC cell. The sample is equilibrated at 25° C. for 1 minute. Subsequently the sample is heated up to 120° C. at a heating rate of 5° C./minute. Once the sample has reached 120° C., the temperature was maintained at 120° C. for 1 minute (thermograph A). Subsequently, the sample is cooled down to −50° C. at a cooling rate of 5 QC/minute (thermograph B); once the sample is reached −50° C., the temperature is maintained at −50° C. for 1 minute. Subsequently, the sample is heated up to 200° C. at a heating rate of 5 QC/minute (thermograph C). Thermographs A, B and C were processed as the Y axis of the thermographs representing the heat flow has exotherm up and endotherm down. Thermograph B is used for measuring the ΔH$_c$ and T$_c$; thermograph C is used to measure the ΔH$_m$ and T$_m$.

14.3 Measurement and Assessment of Properties of the Thermosetting Powder Coating Compositions and the Powder Coatings Thereof (Table 6)

The physical storage stability (PSS) of the thermosetting powder coating compositions of Table 7 was tested according to ISO 8130/part 8, at 40° C. for a total of 7 weeks. The measurement of the PSS of said thermosetting powder coating compositions was initiated upon extrusion and cooling down at room temperature for about 3 hours. The greater the extent of agglomeration or sintering the poorer the PSS, thus the lower its ranking according to the following scale. The extent of agglomeration was visually assessed and ranked according to the following rating on a 1-10 scale (1 representing the worst PSS and 10 the best PSS):

10: No change.
9: No agglomeration, very good fluidity.
8: No agglomeration, good fluidity.
7: Very low agglomeration; agglomeration can be dispersed by one light tap into a fine powder.
6: Very low agglomeration; agglomeration can be dispersed by several taps into a fine powder.
5: Low agglomeration; agglomeration can be dispersed by hand pressure into a fine powder.
4: Low agglomeration; agglomeration cannot be dispersed by hand pressure in a fine powder.
3: Severe agglomeration into several large lumps, material is pourable.
2: Severe agglomeration into several large lumps, material is not pourable.
1: product sintered to one lump, volume reduced.

The coating (film) thickness of the powder coatings derived upon heat curing of the corresponding thermosetting powder coating compositions, was measured with a Posi-Tector 6000 coating thickness gauge from DeFelsko Corporation according to EN ISO 2808:2007.

Reverse impact resistance (RIR) [in.-lb (inch-pounds), 1 inch/lbs=0.055997 m/kg] was tested according to ASTM D 2794, with a ⅝" ball at 20, 40 and 60 in.-lb and at a film thickness of 50±5 μm on ALQ-46 panels on the same day after the curing took place and the coating was cooled to room temperature. The number of in.-lb mentioned in the row for RIR indicates the maximum in.-lb a powder coating withstood when its corresponding thermosetting powder coating composition was cured for 12 minutes at 160° C. A '0' indicates that the coating did not withstand an impact of 20 in.-lb.

Low bake of a cured thermosetting powder coating composition (or 'thermosetting cured powder coating composition') is defined herein as the curing temperature and time condition at which the resulted powder coating having coating thickness of 50±5 μm, showed no cracks or delamination after having been subjected to reverse impact resistance was tested on ALQ-46 panels according to ASTM D 2794 as described above.

Gloss 60° of the powder coatings derived upon curing of the corresponding thermosetting powder coating compositions on ALQ-46 panels were measured according to ASTM D523 with a BYK-Gardner GmbH Haze-Gloss meter. The gloss is reported at angle 60° in gloss units and it was measured at a film thickness of 60±5 μm on ALQ-46 panels.

14.4 Examples 1-3: Synthesis of Polyester Resins P-1, CompP1-1 and CompP1-2: General The composition of the polyester resins P-1, CompP1-1 and CompP1-2 as shown in Table 1, refers to a yield of 1.0 Kg of polyester resin.

The polyester resins of Examples P-1, CompP1-1 and CompP1-2 were prepared via a two phase (or two step) polycondensation reaction. At the end of the first step a hydroxyl functional polyester resin was obtained (mentioned herein as precursor); next the hydroxyl functional polyester resin was reacted further with excess of carboxylic acid functional monomers to obtain the polyester resins P-1, CompP1-1 and CompP1-2.

The polyester resins P-1, CompP-1 and CompP-2 are all carboxylic acid functional polyesters and all of them have a hydroxyl value (OHV) lower than 7 mg KOH/g polyester resin.

Each of the polyester resins P-1, CompP1-1 and CompP1-2 was solid at room temperature and at atmospheric pressure.

Each of the polyester resins P-1, CompP1-1 and CompP1-2 was amorphous.

The synthesis of polyester resins CompP1-1 and CompP1-2 was performed analogously to the synthesis of polyester resin P-1 described herein after.

14.4.1 Example 1: Synthesis of Polyester Resin P-1

A reactor vessel fitted with a thermometer, a stirrer and a distillation device for the removal of water formed during the synthesis, was filled with butyl stanoic acid (1 g) (catalyst), neopentyl glycol (288.5 g, 2.77 mol), ethylene glycol (89.0 g, 1.43 mol). The vessel was heated up to 150° C. until the mixture was molten. Then terephthalic acid (571.8 g, 3.44 mol), adipic acid (46.6 g, 0.35 mol) and trimellitic anhydride (20.0 g, 0.10 mol) were added and under a nitrogen flow the temperature was gradually increased to 260° C. while distilling off the reaction water until the acid value of the precursor of the polyester resin was between 9 and 15 mg KOH/g. The reaction mixture was cooled to 240° C. and vacuum was applied until the precursor of the polyester resin reached the desired acid value (7.0 mg KOH/g); that marked the completion of the first step. For the second step the reaction mixture was cooled to 200° C. and subsequently the trimellitic anhydride (113.9 g, 0.59 mol) was added. The temperature was raised to 225° C. and the polyester resin was stirred for one hour at 225° C. Subsequently the polyester resin was cooled down to 195° C. (marking the end of the second step), prior being discharged onto an aluminum foil that was kept at room temperature.

14.5 Examples 4-16: Synthesis of Polyester Resins P1-1, P1-2, P1-3, P1-4 and CompP1-1, CompP1-2, CompP1-3, CompP1-4, CompP1-5, CompP1-6, CompP1-7, CompP1-8, CompP1-9: General The composition of polyester resins P1-1, P1-2, P1-3, P1-4 and CompP1-1, CompP1-2, CompP1-3, CompP1-4, CompP1-5, CompP1-6, CompP1-7, CompP1-8, CompP1-9 as shown in Tables 2 and 3, refer to a yield of 1.0 Kg of polyester resin.

The polyester resins P1-1, P1-2, P1-3, P1-4 and CompP1-1, CompP1-2, CompP1-3, CompP1-4, CompP1-5, CompP1-6, CompP1-7, CompP1-8, CompP1-9 were prepared via a two phase (or two step) polycondensation reaction. At the end of the first step a hydroxyl functional polyester resin (mentioned herein as precursor) was obtained; next the hydroxyl functional polyester resin was reacted further with excess of carboxylic acid functional monomers to obtain the branched amorphous carboxylic acid functional polyesters of the Examples P1-1, P1-2, P1-3, P1-4 and CompP1-1, CompP1-2, CompP1-3, CompP1-4, CompP1-5, CompP1-6, CompP1-7, CompP1-8, CompP1-9.

The polyester resins of Tables 2 and 3 were all carboxylic acid functional polyesters and all of them had a hydroxyl value (OHV) lower than 5 mg KOH/g polyester resin.

Each of the polyester resins of Tables 2 and 3 was solid at room temperature and at atmospheric pressure.

Each of the polyester resins shown in Tables 2 and 3 was amorphous.

The synthesis of the polyester resins P1-2, P1-3, P1-4 and CompP1-1, CompP1-2, CompP1-3, CompP1-4, CompP1-5, CompP1-6, CompP1-7, CompP1-8, CompP1-9 was performed analogously to the synthesis of polyester resin P1-1 described herein after.

14.5.1 Example 4: Synthesis of the Polyester Resin P1-1

A reactor vessel fitted with a thermometer, a stirrer and a distillation device for the removal of water formed during the synthesis, was filled with butyl stannoic acid (1 g) (catalyst), neopentyl glycol (314.8 g, 3.02 mol), trimethylol propane (8.03 g, 0.06 mol), ethylene glycol (55.0 g, 0.89 mol), 1,6-hexanediol (31.2 g, 0.26 mol). The vessel was heated up to 150° C. until the mixture was molten. Then terephthalic acid (620.2 g, 3.73 mol) and isophthalic acid (23.1 g, 0.14 mol) were added and under a nitrogen flow the temperature was gradually increased to 260° C. while distilling off the reaction water, until the reaction mixture was clear and the acid value of the precursor of the polyester resin was between 5 and 15 mg KOH/g; that marked the completion of the first step. For the second step the reaction mixture was cooled to 200° C. and subsequently the adipic acid (45.8 g, 0.31 mol) and isophthalic acid (44.0 g, 0.26 mol) were added. The temperature was raised to 250° C. while distilling off water; subsequently vacuum was applied until the polyester resin reached the desired acid value range (25.0 mg KOH/g polyester resin). Subsequently, the vacuum was stopped and the polyester resin was cooled down to 195° C. (marking the end of the second step), prior being discharged onto an aluminum foil that was kept at room temperature.

14.6 Preparation of Thermosetting Powder Coating Compositions of Table 4: General Procedure The components used to prepare the thermosetting powder coating compositions PCC A-1, CompPCC A-1, CompPCC A-2 are described in Table 4; Primid® XL-552 ($T_m$=120-124° C., hydroxyl value 620-700 mg KOH/g Primid® XL-552) is a BHA-compound supplied from EMS Chemie and it was used as a crosslinker.

The brown mixture mentioned in Table 4 consisted of 0.4 g Printex® 300 (carbon black from Evonik Degussa GmbH), 1.9 g Bayferrox® red 130M (Pigment red C.I. 101 $Fe_2O_3$ from Bayer B.V.), 2.9 g Bayferrox® 920 (CA. pigment yellow 42 FeOOH from Bayer), 2.2 g SICOTAN® Yellow L2010 (chromium(III)/antimony(V)/titanium dioxide rutile from BASF), 25.0 g Blanc fixe micro (precipitated barium-sulphate from Sachtleben Chemie GmbH), 1.5 g Resiflow® PV 5 (flow control agent from Worlée-Chemie GmbH) and 0.4 g benzoin (degassing agent). The total amount of the brown mixture used was 34.3 pph binder (=polyester resin and crosslinker). The total amount of the brown mixture that is to be used is 34.3 pph binder (=polyester resin and crosslinker) and the amounts of the individual components of the brown mixture should also be used in a ratio proportional to the one described in this paragraph for the brown mixture. The foregoing applies for any thermosetting powder coating composition (inventive or comparative) that is formulated with the brown mixture.

The thermosetting powder coating compositions of Table 4 were prepared by mixing their components in a blender and subsequently extruding the obtained mixture in a PRISM TSE16 PC twin screw at 120° C. with a screw speed of 200 rpm. The extrudate was allowed to cool at room temperature and it was then chopped into chips. The chips were milled in a Retsch ZM100 with a 0.5 mm ring sieve at 18000 rpm and then sieved. The sieve fraction with particle size below 90 μm was collected.

All the thermosetting powder coating compositions of Table 4 were brown.

14.7 Preparation of Thermosetting Powder Coating Compositions of Table 5: General Procedure The components used to prepare the thermosetting powder coating compositions PCC A1-1, PCC A1-2, PCC A1-3, PCC A1-4, CompPCC A1-1, CompPCC A1-2, CompPCC A1-3, CompPCC A1-4, CompPCC A1-5, CompPCC A1-6, CompPCC A1-7, CompPCC A1-8 and CompPCC A1-9, are described in Table 5; Primid® XL-552 ($T_m$=120-124° C., hydroxyl value 620-700 mg KOH/g Primid® XL-552) is a BHA-compound supplied from EMS Chemie and it was used as a crosslinker.

The brown mixture mentioned in Table 5 was the same as the one used for the preparation of the thermosetting powder coating compositions of Table 4 and the total amount of the brown mixture used was 34.3 pph binder (=polyester resin and crosslinker).

The thermosetting powder coating compositions of Table 5 were prepared by mixing their components in a blender and subsequently extruding the obtained mixture in a PRISM TSE16 PC twin screw at 120° C. with a screw speed of 200 rpm. The extrudate was allowed to cool at room temperature and it was then chopped into chips. The chips were milled in a Retsch ZM100 with a 0.5 mm ring sieve at 18000 rpm and then sieved. The sieve fraction with particle size below 90 μm was collected.

All the thermosetting powder coating compositions of Table 5 were brown.

14.8 Preparation of Thermosetting Powder Coating Compositions of Tables 6-7: General Procedure The thermosetting powder coating compositions of Tables 6 and 7 were prepared by physical mixing carried out by mechanical mixing/blending of their components; the components of each of the thermosetting powder coating compositions of Tables 6 and 7 were the two different, separate and distinct thermosetting powder coating compositions of Tables 4 and 5; each of the thermosetting powder coating compositions of Table 6 were prepared by physically mixing in a blender 100 g of each of their components. For example PCC B-1 was prepared by physically mixing 100 g of PCC A-1 with 100 g of PCC A1-1. All the thermosetting powder coating compositions of Table 6 were brown.

Each of the thermosetting powder coating compositions of Table 7—apart from Example 33 which was prepared as those examples in Table 6—were prepared by physically mixing in a blender amounts such amounts of each of their components so that to obtain thermosetting powder coating compositions B having different weight ratios R. For example PCC B8 was prepared by physically mixing 120 g of PCC A-1 with 80 g of PCC A1-1 (R=1.50). All the thermosetting powder coating compositions of Table 7 were brown.

Once prepared the thermosetting powder coating compositions of Table 6, were electrostatically sprayed (corona, 60 kV) onto 0.8 mm thick chromate aluminium Q-panels (type: ALQ-46) to a coating thickness to suit each test mentioned herein and cured at 160° C. for 12 minutes in an air-circulation oven (Heraeus Instruments UT6120) at atmospheric pressure to provide brown powder coatings.

14.9 Preparation of Thermosetting Powder Coating Compositions of Table 8: General Procedure The components used to prepare the thermosetting powder coating compositions PCC A-2, and PCC A1-5 are described in Table 8; Araldite® GT-7004 (softening point=95-101° C., epoxy equivalent 714-752 g/equivalent Araldite® GT-7004) is an epoxy compound (epoxy resin) supplied from Huntsman Advanced Materials (Europe) BVBA and it was used as a crosslinker.

The brown mixture mentioned in Table 8 was the same as the one used for the preparation of the thermosetting powder coating compositions of Table 4 wherein each of the individual components of the brown mixture was used in a ratio proportional to the one described for the brown mixture which was used for the preparation of the of Table 4 and wherein the total amount of the brown mixture that was used for the thermosetting powder coating compositions of Table 8 was 34.3 pph binder (=polyester resin and crosslinker).

The thermosetting powder coating compositions of Table 8 were prepared by mixing their components in a blender and subsequently extruding the obtained mixture in a PRISM TSE16 PC twin screw at 120° C. with a screw speed of 200 rpm. The extrudate was allowed to cool at room temperature and it was then chopped into chips. The chips were milled in a Retsch ZM100 with a 0.5 mm ring sieve at 18000 rpm and then sieved. The sieve fraction with particle size below 90 μm was collected.

All the thermosetting powder coating compositions of Table 8 were brown.

14.10 Preparation of Thermosetting Powder Coating Compositions of Table 9: General Procedure The thermosetting powder coating compositions of Table 9 were prepared by physical mixing carried out by mechanical mixing/blending of their components; the components of each of the thermosetting powder coating compositions of Table 9 were the two different, separate and distinct thermosetting powder coating compositions of Table 8; each of the thermosetting powder coating compositions of Table 9 were prepared by physically mixing in a blender such amounts of each of their components so that to obtain thermosetting powder coating compositions B having different weight ratios R. For example PCC B10 was prepared by physically mixing 134 g of PCC A-2 with 66 g of PCC A1-5 (R=2.03). All the thermosetting powder coating compositions of Table 9 were brown.

Once prepared the thermosetting powder coating compositions of Table 9, were electrostatically sprayed (corona, 60 kV) onto 0.8 mm thick chromate aluminium Q-panels (type: ALQ-46) to a coating thickness to suit each test mentioned herein and cured at 160° C. for 12 minutes in an air-circulation oven (Heraeus Instruments UT6120) at atmospheric pressure to provide brown powder coatings.

TABLE 1

Composition and characterization of a polyester resin according to P (Example 1) and polyester resins comparative to P (Examples 2-3).

| | Example P-1 | Example 2 CompP-1 | Example 3 CompP-2 |
|---|---|---|---|
| Monomers first step | | | |
| Neopentylglycol (mol) | 2.77 | 2.72 | 2.78 |
| Ethyleneglycol (mol) | 1.43 | 1.43 | 1.49 |
| Terephthalic acid (mol) | 3.44 | 3.29 | 3.58 |
| Adipic acid (mol) | 0.35 | 0.35 | 0.36 |
| Trimellitic anhydride (mol) | 0.10 | 0.12 | 0.09 |
| Monomers second step | | | |
| Trimellitic anhydride (mol) | 0.59 | 0.71 | 0.48 |
| Total (mol) | 8.69 | 8.62 | 8.78 |
| Monomers first step | | | |
| Neopentylglycol (g) | 288.5 | 283.3 | 289.1 |
| Ethyleneglycol (g) | 89.0 | 88.8 | 92.7 |
| Terephthalic acid (g) | 571.8 | 547.1 | 595.1 |
| Adipic acid (g) | 46.6 | 46.6 | 48.5 |
| Trimellitic anhydride (g) | 20.0 | 23.1 | 16.7 |
| Monomers second step | | | |
| Trimellitic anhydride (g) | 113.9 | 136.9 | 92.0 |
| Total weight (g) | 1129.8 | 1125.8 | 1134.1 |
| Water formed during synthesis (g) | 129.8 | 125.8 | 134.1 |
| Weight (g) of resin produced | 1000 | 1000 | 1000 |
| Monomers | | | |
| Neopentylglycol (mol %) | 31.9 | 31.5 | 31.6 |
| Ethyleneglycol (mol %) | 16.5 | 16.6 | 17.0 |
| Terephthalic acid (mol %) | 39.6 | 38.2 | 40.8 |
| Adipic acid (mol %) | 4.0 | 4.0 | 4.1 |
| Trimellitic anhydride (mol %) | 8.0 | 9.7 | 6.5 |
| Total (mol %) | 100 | 100 | 100 |
| Theoretical values of polyester resin | | | |
| AV (mg KOH/g polyester resin) | 73.4 | 84.4 | 59.5 |
| OHV (mg KOH/g polyester resin) | 5.9 | 4.8 | 4.1 |
| Functionality (f) | 3.93 | 4.19 | 3.99 |
| Mn (Da) | 2775 | 2637 | 3515 |
| Measured values of polyester resin | | | |
| Tg (° C.) | 63.2 | 64.1 | 61.7 |
| Viscosity (Pa · s) @ 160° C. | 43.9 | 41.4 | 50.3 |
| AV (mg KOH/g polyester resin) | 71.5 | 84 | 61.6 |
| OHV (mg KOH/g polyester resin) | 3.8 | 6.4 | 4.8 |

TABLE 2

Composition and characterization of polyester resins according to P1.

| | Example 4 P1-1 | Example 5 P1-2 | Example 6 P1-3 | Example 7 P1-4 |
|---|---|---|---|---|
| Monomers first step | | | | |
| Neopentylglycol (mol) | 3.02 | 2.99 | 2.67 | 2.42 |
| Trimethylolpropane (mol) | 0.06 | 0.07 | 0.07 | 0.06 |
| Ethyleneglycol (mol) | 0.89 | 0.88 | 1.29 | 1.63 |
| 1,6-Hexanediol (mol) | 0.26 | 0.26 | 0.27 | 0.26 |
| Isophthalic acid (mol) | 0.14 | 0.10 | 0.13 | 0.16 |
| Terephthalic acid (mol) | 3.73 | 3.75 | 3.81 | 3.84 |
| Monomers second step | | | | |
| Adipic acid (mol) | 0.31 | 0.31 | 0.31 | 0.32 |
| Isophthalic acid (mol) | 0.26 | 0.30 | 0.28 | 0.25 |
| Total (mol) | 8.68 | 8.67 | 8.83 | 8.95 |
| Monomers first step | | | | |
| Neopentylglycol (g) | 314.8 | 311.1 | 278.1 | 251.7 |
| Trimethylolpropane (g) | 8.3 | 9.5 | 8.8 | 8.4 |
| Ethyleneglycol (g) | 55.0 | 54.9 | 80.3 | 100.9 |
| 1,6-Hexanediol (g) | 31.2 | 31.2 | 31.7 | 30.9 |
| Isophthalic acid (g) | 23.1 | 17.4 | 21.7 | 26.7 |
| Terephthalic acid (g) | 620.2 | 622.3 | 632.6 | 638.7 |
| Monomers second step | | | | |
| Adipic acid (g) | 45.8 | 45.8 | 45.4 | 47.2 |
| Isophthalic acid (g) | 44.0 | 49.5 | 46.2 | 42.3 |
| Total weight (g) | 1142.4 | 1141.6 | 1144.9 | 1146.8 |
| Water formed during synthesis (g) | 142.4 | 141.6 | 144.9 | 146.8 |
| Weight (g) of resin produced | 1000 | 1000 | 1000 | 1000 |
| Monomers | | | | |
| Neopentylglycol (mol %) | 34.8 | 34.5 | 30.3 | 27.0 |
| Trimethylolpropane (mol %) | 0.7 | 0.8 | 0.7 | 0.7 |
| Ethyleneglycol (mol %) | 10.2 | 10.2 | 14.7 | 18.2 |
| 1,6-Hexanediol (mol %) | 3.0 | 3.0 | 3.0 | 2.9 |
| Isophthalic acid (mol %) | 4.7 | 4.6 | 4.7 | 4.6 |

TABLE 2-continued

Composition and characterization of polyester resins according to P1.

|  | Example 4 P1-1 | Example 5 P1-2 | Example 6 P1-3 | Example 7 P1-4 |
|---|---|---|---|---|
| Terephthalic acid (mol %) | 43.0 | 43.2 | 43.1 | 43.0 |
| Adipic acid (mol %) | 3.6 | 3.6 | 3.5 | 3.6 |
| Total (mol %) | 100 | 100 | 100 | 100 |
| Theoretical values of polyester resin | | | | |
| AV (mg KOH/g polyester resin) | 23.8 | 27.8 | 24.8 | 23.8 |
| OHV (mg KOH/g polyester resin) | 2.9 | 3.0 | 2.7 | 3.0 |
| Functionality (f) | 2.30 | 2.30 | 2.31 | 2.30 |
| Mn (Da) | 4823 | 4196 | 4715 | 4822 |
| Measured values of polyester resin | | | | |
| Tg (° C.) | 55.1 | 55.5 | 55.1 | 55.3 |
| Viscosity (Pa · s) g 160° C. | 69.6 | 55.6 | 66.3 | 58.1 |
| AV (mg KOH/g polyester resin) | 24.3 | 27 | 25.6 | 24.4 |
| OHV (mg KOH/g polyester resin) | 2.7 | 2.6 | 2.8 | 3.8 |

TABLE 3

Composition and characterization of polyester resins comparative to polyester resins P1.

|  | Example 8 Comp P1-1 | Example 9 Comp P1-2 | Example 10 Comp P1-3 | Example 11 Comp P1-4 | Example 12 Comp P1-5 |
|---|---|---|---|---|---|
| Monomers first step | | | | | |
| Neopentylglycol (mol) | 3.08 | 3.10 | 2.91 | 3.75 | 3.63 |
| Trimethylolpropane (mol) | 0.05 | 0.04 | 0.09 | 0.06 | 0.06 |
| Ethyleneglycol (mol) | 0.89 | 0.89 | 0.89 | — | 0.16 |
| 1,6-Hexanediol (mol) | 0.26 | 0.26 | 0.27 | 0.25 | 0.26 |
| Isophthalic acid (mol) | 0.19 | 0.21 | 0.05 | 0.11 | 0.12 |
| Terephthalic acid (mol) | 3.71 | 3.71 | 3.76 | 3.60 | 3.62 |
| Monomers second step | | | | | |
| Adipic acid (mol) | 0.31 | 0.31 | 0.32 | 0.31 | 0.30 |
| Isophthalic acid (mol) | 0.21 | 0.20 | 0.35 | 0.29 | 0.27 |
| Total (mol) | 8.71 | 8.72 | 8.64 | 8.36 | 8.43 |
| Monomers first step | | | | | |
| Neopentylglycol (g) | 320.7 | 322.6 | 303.0 | 390.3 | 377.6 |
| Trimethylolpropane (g) | 6.5 | 5.9 | 11.7 | 8.6 | 8.3 |
| Ethyleneglycol (g) | 55.0 | 55.0 | 55.4 | — | 10.0 |
| 1,6-Hexanediol (g) | 31.2 | 31.1 | 31.4 | 30.0 | 30.3 |
| Isophthalic acid (g) | 31.8 | 34.4 | 8.6 | 18.3 | 19.7 |
| Terephthalic acid (g) | 616.9 | 616.0 | 624.8 | 597.3 | 602.2 |
| Monomers second step | | | | | |
| Adipic acid (g) | 45.8 | 45.8 | 46.2 | 44.6 | 44.5 |
| Isophthalic acid (g) | 35.7 | 33.1 | 59.0 | 47.4 | 45.5 |
| Total weight (g) | 1143.5 | 1143.9 | 1140.0 | 1136.5 | 1138.0 |
| Water formed during synthesis (g) | 143.5 | 143.9 | 140.0 | 136.5 | 138.0 |
| Weight (g) of resin produced | 1000 | 1000 | 1000 | 1000 | 1000 |
| Monomers | | | | | |
| Neopentylglycol (mol %) | 35.3 | 35.5 | 33.7 | 44.8 | 43.0 |
| Trimethylolpropane (mol %) | 0.6 | 0.5 | 1.0 | 0.8 | 0.7 |
| Ethyleneglycol (mol %) | 10.2 | 10.2 | 10.3 | — | 1.9 |
| 1,6-Hexanediol (mol %) | 3.0 | 3.0 | 3.1 | 3.0 | 3.0 |
| Isophthalic acid (mol %) | 4.7 | 4.7 | 4.7 | 4.7 | 4.6 |

TABLE 3-continued

Composition and characterization of polyester resins comparative to polyester resins P1.

| | | | | | |
|---|---|---|---|---|---|
| Terephthalic acid (mol %) | 42.6 | 42.5 | 43.5 | 43.0 | 43.0 |
| Adipic acid (mol %) | 3.6 | 3.6 | 3.7 | 3.7 | 3.6 |
| Total (mol %) | 100 | 100 | 100 | 100 | 100 |
| Theoretical values of polyester resin | | | | | |
| AV (mg KOH/g polyester resin) | 17.8 | 15.9 | 34.7 | 24.8 | 23.8 |
| OHV (mg KOH/g polyester resin) | 2.9 | 3.0 | 2.7 | 2.5 | 3.0 |
| Functionality (f) | 2.30 | 2.30 | 2.30 | 2.30 | 2.30 |
| Mn (Da) | 6208 | 6873 | 3451 | 4741 | 4815 |
| Measured values of polyester resin | | | | | |
| Tg (° C.) | 55 | 56.3 | 54.4 | 56.1 | 55.8 |
| Viscosity (Pa · s) @ 160° C. | 115.7 | 185.7 | 37.4 | 60.9 | 58.9 |
| AV (mg KOH/g polyester resin) | 18.9 | 16.1 | 35.7 | 25.2 | 24.2 |
| OHV (mg KOH/g polyester resin) | 2.5 | 2.5 | 2.7 | 2.8 | 2.3 |

| | Example 13 CompP1-6 | Example 14 CompP1-7 | Example15 CompP1-8 | Example 16 CompP1-9 |
|---|---|---|---|---|
| Monomers first step | | | | |
| Neopentylglycol (mol) | 3.30 | 3.21 | 2.86 | 2.59 |
| Trimethylolpropane (mol) | 0.06 | 0.06 | 0.06 | 0.06 |
| Ethyleneglycol (mol) | 0.89 | 0.89 | 0.88 | 0.88 |
| 1,6-Hexanediol (mol) | — | 0.08 | 0.42 | 0.68 |
| Isophthalic acid (mol) | 0.14 | 0.14 | 0.14 | 0.13 |
| Terephthalic acid (mol) | 3.75 | 3.74 | 3.72 | 3.71 |
| Monomers second step | | | | |
| Adipic acid (mol) | 0.31 | 0.31 | 0.31 | 0.31 |
| Isophthalic acid (mol) | 0.26 | 0.26 | 0.26 | 0.27 |
| Total (mol) | 8.72 | 8.71 | 8.67 | 8.63 |
| Monomers first step | | | | |
| Neopentylglycol (g) | 343.7 | 334.4 | 297.4 | 269.4 |
| Trimethylolpropane (g) | 8.3 | 8.3 | 8.2 | 8.4 |
| Ethyleneglycol (g) | 55.2 | 55.1 | 54.9 | 54.7 |
| 1,6-Hexanediol (g) | — | 10.0 | 50.0 | 80.0 |
| Isophthalic acid (g) | 23.5 | 23.4 | 22.9 | 22.4 |
| Terephthalic acid (g) | 622.5 | 621.7 | 618.8 | 616.7 |
| Monomers second step | | | | |
| Adipic acid (g) | 46.0 | 45.9 | 45.7 | 45.6 |
| Isophthalic acid (g) | 43.8 | 43.8 | 44.0 | 44.3 |
| Total weight (g) | 1142.9 | 1142.8 | 1142.0 | 1141.5 |
| Water formed during synthesis (g) | 142.9 | 142.8 | 142.0 | 141.5 |
| Weight (g) of resin produced | 1000 | 1000 | 1000 | 1000 |
| Monomers | | | | |
| Neopentylglycol (mol %) | 37.9 | 36.9 | 33.0 | 30.0 |
| Trimethylolpropane (mol %) | 0.7 | 0.7 | 0.7 | 0.7 |
| Ethyleneglycol (mol %) | 10.2 | 10.2 | 10.2 | 10.2 |
| 1,6-Hexanediol (mol %) | — | 1.0 | 4.9 | 7.8 |
| Isophthalic acid (mol %) | 4.6 | 4.6 | 4.7 | 4.7 |
| Terephthalic acid (mol %) | 43.0 | 43.0 | 43.0 | 43.0 |
| Adipic acid (mol %) | 3.6 | 3.6 | 3.6 | 3.6 |
| Total (mol %) | 100 | 100 | 100 | 100 |
| Theoretical values of polyester resin | | | | |
| AV (mg KOH/g polyester resin) | 23.8 | 23.8 | 23.8 | 23.8 |
| OHV (mg KOH/g polyester resin) | 3.0 | 3.0 | 3.0 | 3.0 |
| Functionality (f) | 2.30 | 2.30 | 2.30 | 2.30 |
| Mn (Da) | 4811 | 4811 | 4811 | 4835 |
| Measured values of polyester resin | | | | |
| Tg (° C.) | 60.6 | 58.2 | 52.7 | 49.6 |
| Viscosity (Pa · s) @ 160° C. | 60.5 | 58.5 | 52.4 | 45.1 |
| AV (mg KOH/g polyester resin) | 24.1 | 23.7 | 24.4 | 24.3 |
| OHV (mg KOH/g polyester resin) | 3.6 | 3.3 | 3.1 | 2.9 |

TABLE 4

Thermosetting powder coating compositions comprising polyester resins according to P and a crosslinker (Example 17), and thermosetting powder coating compositions comprising polyester resins comparative to P and a crosslinker (Examples 18-19; Comparative).

|  | Example 17 PCC A-1 | Example 18 Comp PCC A-1 | Example 19 Comp PCC A-2 |
|---|---|---|---|
| Polyester resin (g) | P-1 (89.3) | CompP-1 (87.7) | CompP-2 (90.8) |
| Primid ® XL552 (g) | 10.7 | 12.3 | 9.2 |
| Brown mixture (g) | 34.3 | 34.3 | 34.3 |

TABLE 5

Thermosetting powder coating compositions comprising polyester resins according to P1 and a crosslinker (Examples 20-23), and thermosetting powder coating compositions comprising polyester resins comparative to P1 and a crosslinker (Examples 24-32; Comparative).

|  | Example 20 PCC A1-1 | Example 21 PCC A1-2 | Example 22 PCC A1-3 | Example 23 PCC A1-4 | Example 24 Comp PCC A1-1 | Example 25 Comp PCC A1-2 | Example 26 Comp PCC A1-3 | Example 27 Comp PCC A1-4 | Example 28 Comp PCC A1-5 | Example 29 Comp PCC A1-6 | Example 30 Comp PCC A1-7 | Example 31 Comp PCC A1-8 | Example 32 Comp PCC A1-9 |
|---|---|---|---|---|---|---|---|---|---|---|---|---|---|
| Polyester resin (g) | P1-1 (96.0) | P1-2 (95.7) | P1-3 (96.0) | P1-4 (96.0) | Comp P1-1 (96.9) | Comp P1-2 (97.4) | Comp P1-3 (94.4) | Comp P1-4 (96.0) | Comp P1-5 (96.0) | Comp P1-6 (96.0) | Comp P1-7 (96.0) | Comp P1-8 (96.0) | Comp P1-9 (96.0) |
| Primid ® XL552 (g) | 4.0 | 4.3 | 4.0 | 4.0 | 3.1 | 2.6 | 5.6 | 4.0 | 4.0 | 4.0 | 4.0 | 4.0 | 4.0 |
| Brown mixture (g) | 34.3 | 34.3 | 34.3 | 34.3 | 34.3 | 34.3 | 34.3 | 34.3 | 34.3 | 34.3 | 34.3 | 34.3 | 34.3 |

TABLE 6

Thermosetting powder coating compositions (physical mixtures of thermosetting powder coating compositions of Tables 4 and 5); Examples 33-36 are according to the invention; Examples 37-47 are comparative.

|  | Example 33 PCC B1 | Example 34 PCC B2 | Example 35 PCC B3 | Example 36 PCC B4 | Example 37 Comp PCC B1 | Example 38 Comp PCC B2 | Example 39 Comp PCC B4 | Example 40 Comp PCC B5 |
|---|---|---|---|---|---|---|---|---|
| Components of the PCC B or CompPCC B Properties | PCC A-1 + PCC A1-1 | PCC A-1 + PCC A1-2 | PCC A-1 + PCC A1-3 | PCC A-1 + PCC A1-4 | PCC A-1 + CompPCC A1-2 | PCC A-1 + CompPCC A1-1 | PCC A-1 + CompPCC A1-3 | PCC A-1 + CompPCC A1-4 |
| Low bake PSS | Yes | Yes | Yes | Yes | No | No | Yes | No |
| Properties of the Powder Coatings | 7 | 9 | 9 | 7 | 8 | 8 | n.m. | 8 |
| Gloss 60° | 30 | 33 | 33 | 33 | 27 | 28 | 44 | 32 |
| RIR (in.-lb) | 60 | 60 | 60 | 60 | 20 | 20 | 60 | 20 |

|  | Example 41 Comp PCC B6 | Example 42 Comp PCC B7 | Example 43 Comp PCC B8 | Example 44 Comp PCC B9 | Example 45 CompPCC B10 | Example 46 CompPCC B11 | Example 47 CompPCC B12 |
|---|---|---|---|---|---|---|---|
| Components of PCC B or CompPCC B Properties | PCC A-1 CompPCC A1-5 | PCC A-1 CompPCC A1-6 | PCC A-1 CompPCC A1-7 | PCC A-1 CompPCC A1-8 | PCC A-1 CompPCC A1-9 | CompPCC A-2 + PCC A1-1 | CompPCC A-1 + PCCA1-1 |
| Low bake PSS | No | No | No | No | Yes | No | No |
| Properties of the Powder Coatings | 9 | 9 | 9 | 3 | 1 | 9 | 4 |
| Gloss 60° | 32 | 33 | 32 | 30 | 30 | 38 | 30 |
| RIR (in.-lb) | 20 | 20 | 20 | 20 | 40 | 20 | 0 |

TABLE 7

Thermosetting powder coating compositions (physical mixtures of thermosetting powder coating compositions of Tables 4 and 5); Examples 33 and 48-51 are according to the invention; Examples 53-53 are comparative.

| | Example 48 PCC B5 | Example 49 PCC B6 | Example 33 PCC B1 | Example 50 PCC B7 | Example 51 PCC B8 | Example 52 Comp PCC B13 | Example 53 Comp PCC B14 |
|---|---|---|---|---|---|---|---|
| Components of the PCC B or CompPCC B | PCC A-1 + PCCA1-1 | PCC A-1 + PCC A1-1 | PCC A-1 + PCC A1-1 | PCC A-1 + PCC A1-1 | PCC A-1 + PCC A1-1 | PCC A-1 + PCC A1-1 | PCC A-1 + PCC A1-1 |
| R | 0.67 | 0.82 | 1 | 1.22 | 1.50 | 0.11 | 9 |
| Properties | | | | | | | |
| Low bake | Yes | Yes | Yes | Yes | Yes | Yes | Yes |
| PSS | 5 | 5 | 7 | 6 | 6 | 5 | 6 |
| Properties of the Powder Coatings | | | | | | | |
| Gloss 60° | 36 | 33 | 30 | 36 | 36 | 77 | 79 |
| RIR (in.-lb) | 60 | 60 | 60 | 60 | 60 | 40 | 60 |

TABLE 8

Thermosetting powder coating composition comprising polyester resin according to P and a crosslinker (Example 54), and thermosetting powder coating composition comprising polyester resin according to P1 and a crosslinker (Example 55).

| | Example 54 PCC A-2 | Example 55 PCC A1-5 |
|---|---|---|
| Polyester resin (g) | P-1 (36.8) | P1-1 (51.9) |
| Araldite® GT-7004 (g) | 37.2 | 22.3 |
| Triphenyl ethyl phosphonium bromide (g) | 0.37 | 0.22 |
| Brown mixture (g) | 25.5 | 25.5 |

TABLE 9

Thermosetting powder coating compositions (physical mixtures of thermosetting powder coating compositions of Table 8); Examples 56-57 are according to the invention; Examples 58-59 are comparative.

| | Example 56 PCC B9 | Example 57 PCC B10 | Example 58 CompPCC B15 | Example 59 CompPCC B16 |
|---|---|---|---|---|
| Components of the PCC B or CompPCC B | PCC A-2 + PCC A1-5 | PCC A-2 + PCC A1-5 | PCC A-2 + PCC A1-5 | PCC A-2 + PCC A1-5 |
| R | 1 | 2.03 | 0.11 | 9 |
| Properties | | | | |
| Low bake | Yes | Yes | Yes | Yes |
| PSS | 9 | 9 | 9 | 9 |
| Properties of the Powder Coatings | | | | |
| Gloss 60° | 35 | 35 | 80 | 74 |
| RIR (in.-lb) | 60 | 60 | 60 | 60 |

The object of the invention was to provide storage stable, low bake thermosetting powder coating compositions that upon curing provide matt powder coatings having good reverse impact resistance (RIR).

By "low bake thermosetting powder coating compositions" is meant herein brown thermosetting powder coating compositions that upon curing at 160° C. for 12 min, provide brown powder coatings having reverse impact resistance (RIR) of 40 in.-lb at a film thickness of 50±5 μm (1 μm=1×10$^{-6}$ m), as RIR is defined and measured herein.

By "thermosetting powder coating composition having good storage stability" is meant herein that a brown thermosetting powder coating composition has a physical storage stability (PSS) of at least 5, more preferably of at least 6, even more preferably of at least 7, on a scale from 1 (very poor storage stability) up to 10 (excellent storage stability), as the PSS is defined and measured herein.

By "matt powder coatings" or "equally "low gloss powder coatings" is meant herein a brown powder coating having a thickness of 60±5 μm that is obtained upon curing at 160° C. for 12 min of a brown thermosetting powder coating composition, said brown powder coating having a gloss 60° of at most 38, preferably of at most 36, more preferably of at most 35, as gloss 60° is defined and measured herein.

By "powder coating having good reverse impact resistance" is meant herein a brown powder coating having a thickness of 50±5 μm that is obtained upon curing at 160° C. for 12 min of a brown thermosetting powder coating composition, said brown powder coating is able to withstand at least 40, preferably at least 45, more preferably at least 50, even more preferably at least 55, most preferably at least 60 in.-lb (1 inch/lbs=0.055997 m/kg), as the reverse impact resistance (RIR) is defined and measured herein.

From the results presented in Tables 6, 7 and 9, it becomes clear that only thermosetting powder coating compositions B (see Examples 33-36, 48-51, 56-57) as described herein and as defined by the claims presented a unique combination of the aforementioned desirable properties; more particularly only the thermosetting powder coating compositions B of Examples 33-36 48-51, and 56-57 were:

low bake; and
storage stable (PSS in the range of 5-9); and provided upon curing
matt powder coatings (gloss 60° in the range of 30-36), having
a reverse impact resistance of 60 in.-lb.

The invention claimed is:
1. A branched carboxylic acid functional polyester resin P, having:
(a) a $T_g$ of at least 40° C. as measured by Differential Scanning calorimetry (DSC) at a heating rate of 5° C./min;

(b) an acid value (AV) of at least 65 and of at most 76.8 mg KOH/g of the polyester resin P;
(c) a hydroxyl value of at most 9 mg KOH/g of the polyester resin P; and
(d) a functionality of at least 3.5 and at most 5; wherein the polyester resin P is a reaction product of at least the following monomers:
   i) neopentyl glycol in an amount of at least 19 and at most 38 mol %;
   ii) ethylene glycol in an amount of at least 8 and at most 21 mol %;
   iii) a polyol in an amount of at least 0 and at most 2 mol %;
   iv) isophthalic acid in an amount of at least 0 and at most 2.4 mol %;
   v) terephthalic acid in an amount of at least 38 and at most 47 mol %;
   vi) adipic acid in an amount of at least 0.01 and at most 10 mol %; and
   vii) a polycarboxylic acid, in an amount of at least 6 and at most 10.2 mol %; and wherein
   the mol % is based on a total amount of monomers i)-vii) forming the polyester resin P being 100 mol %.

2. The branched carboxylic acid functional polyester resin P according to claim 1, wherein the polyol monomer iii) is present in an amount of at least 0 and at most 1.4 mol %.

3. The branched carboxylic acid functional polyester resin P according to claim 2, wherein the branched carboxylic acid functional polyester resin P has an AV of at least 68 mg KOH/g of the polyester resin P.

4. The branched carboxylic acid functional polyester resin P according to claim 1, wherein the branched carboxylic acid functional polyester resin P has an AV of at least 68 mg KOH/g of the polyester resin P.

5. The branched carboxylic acid functional polyester resin P according to claim 4, wherein the neopentyl glycol monomer i) is present in an amount of at most 36.5 mol %.

6. The branched carboxylic acid functional polyester resin P according to claim 5, wherein the polyol monomer iii) is present in an amount of at least 0 and at most 1.4 mol %.

7. The branched carboxylic acid functional polyester resin P according to claim 6, wherein the hydroxyl value of the polyester resin P is at most 7 mg KOH/g of the polyester resin P.

8. The branched carboxylic acid functional polyester resin P according to claim 1, wherein the neopentyl glycol monomer i) is present in an amount of at most 36.5 mol %.

9. The branched carboxylic acid functional polyester resin P according to claim 1, wherein the polycarboxylic acid monomer (vii) is present in an amount of at least 6.5 mol %.

10. The branched carboxylic acid functional polyester resin P according to claim 1, wherein the hydroxyl value of the polyester resin P is at most 8 mg KOH/g of the polyester resin P.

11. The branched carboxylic acid functional polyester resin P according to claim 1, wherein the hydroxyl value of the polyester resin P is at most 7 mg KOH/g of the polyester resin P.

12. The branched carboxylic acid functional polyester resin P according to claim 1, wherein the hydroxyl value of the polyester resin P is at most 6 mg KOH/g of the polyester resin P.

13. The branched carboxylic acid functional polyester resin P according to claim 1, wherein the hydroxyl value of the polyester resin P is at most 5 mg KOH/g of the polyester resin P.

14. The branched carboxylic acid functional polyester resin P according to claim 1, wherein the hydroxyl value of the polyester resin P is at least 0.01 and at most 5 mg KOH/g of the polyester resin P.

15. A thermosetting powder coating composition A (PCC A) comprising a binder K in an amount of at least 20 and at most 100 pph of PCC A, wherein the binder K comprises:
   a crosslinker X in an amount of at least 1 and at most 55 pph of the binder K, wherein the crosslinker X is selected from the group consisting of epoxy compounds, compounds having at least two β-hydroxyalkylamide groups (BHA compounds), and mixtures thereof; and
   the branched carboxylic acid functional polyester resin P according to claim 1 in an amount of at least 45 and at most 99 pph of the binder K.

16. The thermosetting powder coating composition A (PCC A) according to claim 15, wherein the crosslinker X is a BHA compound.

17. The thermosetting powder coating composition A (PCC A) according to claim 16, wherein the amount of the crosslinker X is at least 2 and at most 20 pph of the binder K and wherein the branched carboxylic acid functional polyester resin P is present in an amount of at least 80 and at most 98 pph of the binder K.

18. A cured thermosetting powder coating composition which is obtained upon curing the thermosetting powder coating composition A (PCC A) as defined in claim 17.

19. The thermosetting powder coating composition A (PCC A) according to claim 16, wherein
   the amount of the crosslinker X is at least 2 and at most 20 pph of the binder K, and wherein
   the branched carboxylic acid functional polyester resin P is present in an amount of at least 80 and at most 98 pph of the binder K and has an AV of at least 68 mg KOH/g of the polyester resin P, and wherein
   the neopentyl glycol monomer i) of the branched carboxylic acid functional polyester resin P is present in an amount of at most 36.5 mol %; and
   the polyol monomer iii) of the branched carboxylic acid functional polyester resin P is present in an amount of at least 0 and at most 1.4 mol %.

20. The thermosetting powder coating composition A (PCC A) according to claim 16, wherein
   the amount of the crosslinker X is at least 2 and at most 20 pph of the binder K, and wherein
   the branched carboxylic acid functional polyester resin P is present in an amount of at least 80 and at most 98 pph of the binder K, has an AV of at least 68 mg KOH/g of the polyester resin P and a hydroxyl value which is at most 7 mg KOH/g of the polyester resin P; and wherein
   the neopentyl glycol monomer i) of the branched carboxylic acid functional polyester resin P is present in an amount of at most 36.5 mol %; and
   the polyol monomer iii) of the branched carboxylic acid functional polyester resin P is present in an amount of at least 0 and at most 1.4 mol %.

* * * * *